United States Patent
Lee et al.

(10) Patent No.: US 10,975,184 B2
(45) Date of Patent: Apr. 13, 2021

(54) HIGH-DENSITY ETHYLENE-BASED POLYMER USING HYBRID SUPPORTED METALLOCENE CATALYST AND PIPE USING SAME

(71) Applicant: HANWHA CHEMICAL CORPORATION, Seoul (KR)

(72) Inventors: In Jun Lee, Suwon-si (KR); Jeong Hyun Park, Incheon (KR); Yu Jeong Lim, Busan (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 16/801,242

(22) Filed: Feb. 26, 2020

(65) Prior Publication Data
US 2020/0190238 A1   Jun. 18, 2020

Related U.S. Application Data

(63) Continuation of application No. PCT/KR2018/007995, filed on Jul. 13, 2018.

(30) Foreign Application Priority Data

Jul. 13, 2017 (KR) .................. 10-2017-0089058
Sep. 21, 2017 (KR) .................. 10-2017-0122093

(51) Int. Cl.
| | | |
|---|---|---|
| C08L 23/08 | (2006.01) | |
| C08F 4/6592 | (2006.01) | |
| C08F 210/16 | (2006.01) | |
| C07F 17/00 | (2006.01) | |

(52) U.S. Cl.
CPC ............ *C08F 210/16* (2013.01); *C07F 17/00* (2013.01); *C08L 23/0815* (2013.01); *C08F 2410/03* (2013.01); *C08F 2420/01* (2013.01); *C08F 2800/10* (2013.01)

(58) Field of Classification Search
CPC ................ C08L 23/8015; C08F 210/16; C08F 4/65904; C08F 4/65925; C08F 4/65927
See application file for complete search history.

(56) References Cited

U.S. PATENT DOCUMENTS

2018/0134828 A1*  5/2018  Doufas ................ C08F 210/16

FOREIGN PATENT DOCUMENTS

| JP | 2007-197722 A | 8/2007 |
|---|---|---|
| KR | 10-0221164 B1 | 9/1999 |
| KR | 10-2013-0052569 A | 5/2013 |
| KR | 10-1692346 B1 | 1/2017 |
| KR | 10-1706073 B1 | 2/2017 |
| KR | 10-1725004 B1 | 4/2017 |
| KR | 10-1835285 B1 | 3/2018 |

OTHER PUBLICATIONS

International Search Report for PCT/KR2018/007995 dated Oct. 17, 2018 (PCT/ISA/210).
Written Opinion for PCT/KR2018/007995 dated Oct. 17, 2018 (PCT/ISA/237).

\* cited by examiner

*Primary Examiner* — Caixia Lu
(74) *Attorney, Agent, or Firm* — Sughrue Mion, PLLC

(57) ABSTRACT

The present invention relates to a high-density ethylene-based polymer and a pipe using the same, the high-density ethylene-based polymer including: an ethylene homopolymer; or a copolymer of ethylene and at least one comonomer selected from the group consisting of an α-olefin, a cyclic olefin and linear, branched and cyclic dienes.
The pipe using the high-density ethylene-based polymer of the present invention has more superior strain hardening than a conventional polyethylene resin pipe, and thus has excellent long-term pressure resistance characteristics and processability.

18 Claims, 5 Drawing Sheets

HIGH-DENSITY ETHYLENE-BASED POLYMER USING HYBRID SUPPORTED METALLOCENE CATALYST AND PIPE USING SAME

CROSS-REFERENCE TO RELATED APPLICATION(S)

This application is a bypass continuation application of International Application No. PCT/KR2018/007995, filed with the Korean Intellectual Property Office on Jul. 13, 2018, which claims priorities to Korean Patent Application No. 10-2017-0089058 filed on Jul. 13, 2017, and Korean Patent Application No. 10-2017-0122093 filed on Sep. 21, 2017, the disclosures of which are hereby incorporated herein by reference in their entireties.

TECHNICAL FIELD

The present invention relates to an ethylene-based polymer using a hybrid supported metallocene catalyst and a pipe using the same, and more particularly, to a pipe using a high-density ethylene-based polymer having excellent long-term pressure resistance characteristics and molding processability, as compared with a conventional polyethylene resin pipe.

The present invention relates to a high-density ethylene-based polymer using a hybrid supported metallocene crystal and a pipe using the same, wherein the high-density ethylene-based polymer has a wide molecular weight distribution and a long chain branch and thus has high melt flowability, thereby providing excellent processability, and contains high molecular weight and thus has excellent mechanical properties, and the pipe has high strain hardening and environmental stress cracking resistance.

BACKGROUND ART

In general, since pipes are buried in the ground and used for a long time, the pipes need to be made of a material having excellent processability and long-term stability from deformation or breakage caused by external pressure. Therefore, high strain hardening properties are required when applying polyethylene that is generally used in pipe manufacture.

Physical properties of polymer materials, such as polyethylene, are sensitive to molding conditions, temperature, time, and environment during storage and transportation, and long-term changes in physical properties of polymer materials are still difficult to accurately predict, thus causing unexpected fracture. In particular, when polymer materials come into contact with chemical solvents, cracking may occur even under extremely low stress or strain conditions. Environmental stress cracking caused by external stimulus is a complex phenomenon including absorption and penetration of solvents, thermodynamics of mixtures, cavitation, partial yielding of materials, and the like. In particular, it has been reported that the rate of environmental stress cracking reaches 15% to 20% among the causes of fractures of products using polymer materials, and environmental stress cracking resistance (ESCR) is emerging as an important figure of polymer materials.

Environmental stress cracking (ESC) is a fracture phenomenon caused by loosening of tie-molecules and chain entanglements in an amorphous phase. Environmental stress cracking resistance, which indicates the resistance to environmental stress cracking, is affected by molecular structure parameters such as a molecular weight distribution and a comonomer distribution. As the molecular weight increases, environmental stress cracking resistance increases because tie-molecule concentration and chain entanglement increase. Therefore, environmental stress cracking resistance increases when short chain branch (SCB) is introduced to increase its content or its distribution, and environmental stress cracking resistance increases when the molecular weight distribution is wide or long chain branch (LCB) is included.

Current methods for measuring environmental stress cracking resistance include a bent strip test (BST) and a full notch creep test (FNCT). However, the two methods have disadvantages of long-term evaluation time and inferior reliability of test results due to the characteristics of environmental stress cracking.

In the manufacture of pipes using a high-density polyethylene polymer, there are molding methods such as injection and extrusion, but these methods are common in that the high-density polyethylene polymer is first molten by heating and then molded. Therefore, the behavior of the high-density polyethylene polymer during heating and melting, that is, the melting property, is an extremely important physical property in molding the high-density polyethylene-based polymer.

In molding such as extrusion, compression, injection, or rotational molding, the melt properties, in particular, the melt flowability of the high-density polyethylene-based polymers, are intrinsic properties that influence satisfactory molding processability. In general, as MI, MFI, and MFR increase, the melt flowability become more excellent.

Conventional high-density polyethylene polymers used for extrusion, compression, injection, or rotational molding are generally prepared by using titanium-based Ziegler-Natta catalysts or chromium-based catalysts. The high-density polyethylene polymers prepared by using such catalysts have a wide molecular weight distribution, thereby improving melt flowability. However, since components having a low molecular weight are mixed, mechanical properties such as impact resistance are significantly deteriorated. Also, since a comonomer distribution is concentrated in a low molecular weight material, chemical resistance is deteriorated. For this reason, there is a problem in that speeding up in injection molding cannot be achieved while maintaining good mechanical properties.

In order to solve these problems, much research has been conducted into metallocene catalysts. U.S. Pat. No. 6,525,150 proposes a metallocene catalyst capable of producing a resin having a narrow molecular weight distribution using uniform active sites of metallocene and having a uniform copolymer distribution in the case of copolymer. However, since the molecular weight distribution is narrow, there is a problem that the mechanical strength is excellent but the molding processability is low.

As described above, in the case of single metallocene catalysts, since the molecular weight distribution is narrow due to uniform active sites, the application development of the metallocene catalyst system has not been progressing much in the field of high-density polyethylene polymer in which the balance between mechanical properties and moldability is important. In order to solve these problems, it has been proposed to widen a molecular weight distribution by using a plurality of reactors or by mixing many kinds of metallocene catalysts. However, there is an improvement in moldability when the method of widening the molecular weight distribution is used, but other physical properties are inevitably deteriorated. Therefore, it was impossible to obtain a high-density polyethylene polymer having excellent physical properties such as mechanical strength obtained by narrowing the molecular weight distribution.

In order to solve the problems of the metallocene catalyst, melt flowability of a polymer is improved by using a catalyst introducing a long chain branch (LCB) to a main chain of a polymer as a branch. However, there is a problem that mechanical properties such as impact resistance are significantly lower than in the case of using a conventional metallocene catalyst.

Many methods have been proposed so as to improve mechanical properties and melt flowability of high-density polyethylene polymers produced using metallocene catalysts. However, in most cases, only solutions to linear low-density polyolefins have been proposed. Also, since metallocene has a characteristic that the activity thereof tends to decrease as a concentration of comonomer decreases, metallocene is not economical due to low activity when producing high-density polyolefins.

In order to solve the above-described problems and produce a high-density polyolefin polymer having excellent mechanical strength and melt flowability and high activity, there is a continuous demand for catalysts and there is a need for improvement thereof.

DESCRIPTION OF EMBODIMENTS

Technical Problem

The present invention has been made in an effort to solve the above-described problems.

An object of the present invention is to provide a high-density ethylene-based polymer and a pipe using the same, which have excellent long-term pressure resistance characteristics and processability as compared with a conventional pipe using a polyethylene resin.

Another object of the present invention is to provide a high-density ethylene-based polymer and a pipe using the same, which provide more accurate pipe physical properties by measuring strain hardening by Hencky strain that is rheological properties, and have more excellent strain hardening and higher environmental stress cracking resistance (ESCR) than a conventional polyethylene resin pipe.

Still another object of the present invention is to provide a high-density polyethylene-based polymer and a pipe using the same, in which since a long chain branch is included by using a metallocene catalyst, a load is small during extrusion, compression, injection, or rotational molding, thereby achieving excellent productivity.

Solution to Problem

In order to achieve the above-described objects of the present invention and achieve the characteristic effects of the present invention described below, the characteristic construction of the present invention is as follows.

The present invention is produced by polymerization of ethylene and at least one monomer selected from the group consisting of α-olefin-based monomers, wherein the polymer includes a long chain branch (LCB), a density is 0.930 g/cm3 to 0.970 g/cm3, an MI is 0.1 g/10 min to 10 g/10 min, an elongation strain measured at 150° C., a strain rate of 1 (1/s) and Hencky strain of 3.0 is 3,000,000 dyn/cm$^2$ to 10,000,000 dyn/cm$^2$ at 150° C., and a ratio of elongation strain at Hencky strain of 3.0 to elongation strain at Hencky strain from 0.5 to 3.0 is 1.0 to 7.0, and a relationship between Hencky strain (εH) and sample length (L) according to time (t) is expressed by Equation 1 below:

$$\varepsilon_H(t)=\dot{\varepsilon}t=\ln L(t)/L_0 \quad \text{[Equation 1]}$$

$\varepsilon_H$: Hencky strain
$\dot{\varepsilon}$: Hencky strain rate (1/s)
$L_0$: initial sample length
$L$: current sample length
$t$: time in seconds Advantageous Effects of Disclosure In the present invention, a high-density ethylene-based polymer and a pipe using the same produced in the presence of a hybrid supported metallocene catalyst have more excellent long-term pressure resistance and processability than a conventional pipe using a polyethylene resin.

BEST MODE

Figure 1:
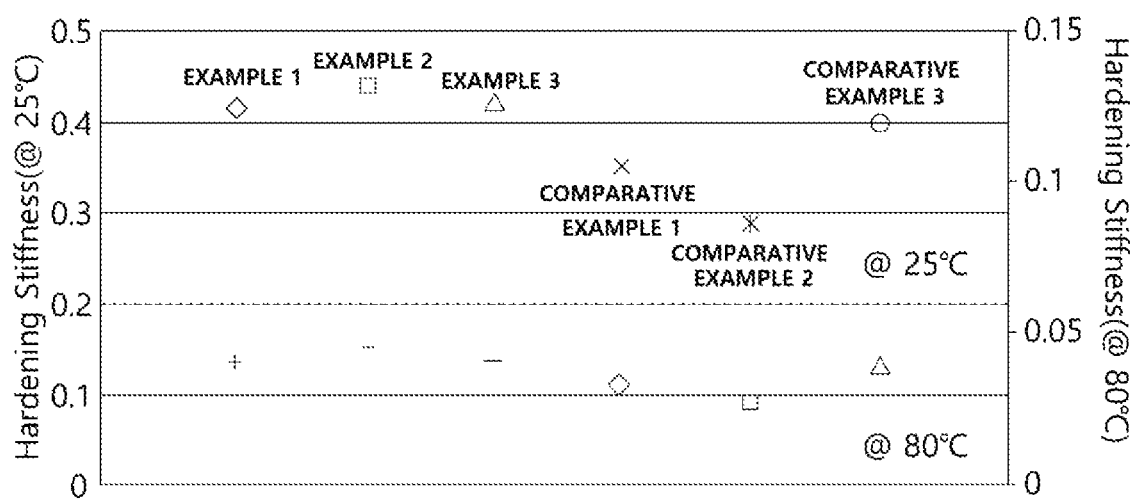
FIG. 1 is a graph showing hardening stiffness of Examples 1 to 3 and Comparative Examples 1 to 3.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

Also, it will be understood that although the terms "first", "second", etc. may be used herein to describe various components, these components should not be limited by these terms. These terms are only used to distinguish one component from another.

Hereinafter, embodiments of the present invention will be described with reference to the accompanying drawings, so that those of ordinary skill in the art can easily carry out the present invention.

The present invention includes a high-density ethylene-based polymer which is polymerized in the presence of a hybrid supported metallocene catalyst.

The polymer is a concept including a copolymer.

Hybrid supported metallocene catalysts of the present invention each independently include at least one first metallocene compound, at least one second metallocene compound, and at least one cocatalyst compound.

The first metallocene compound, which is a transition metal compound according to the present invention, may be represented by Formula 1 below.

The first metallocene compound serves to exhibit high activity at the hybrid supported catalyst and serves to improve melt flowability of a produced polymer.

The first metallocene compound has a low mixing rate of comonomer and has characteristics of forming a low molecular weight material, thereby improving processability in processing the polymer.

In addition, high density is formed due to low mixing of comonomer, and high activity is exhibited even in high-density production.

Since the first metallocene compound has an asymmetric structure and a non-bridge structure having different ligands, the first metallocene compound forms a steric hindrance in which the comonomer hardly approaches a catalystic active site. Therefore, the first metallocene serves to reduce the mixing of the comonomer and exhibits both processability and high catalytic activity in the production of the hybrid supported metallocene.

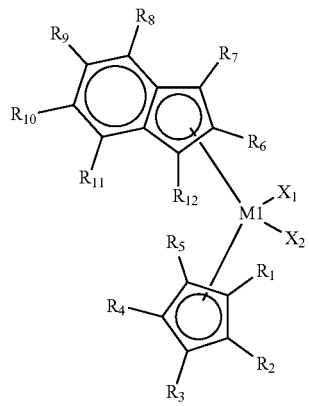

[Formula 1]

In Formula 1, M1 may be a group 4 transition metal of the periodic table of the elements, $X_1$ and $X_2$ may each independently be one of halogen atoms, $R_1$ to $R_{12}$ may each independently be a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and may be linked to each other to form a ring, cyclopentadiene linked to $R_1$ to $R_5$ and indene linked to $R_6$ to $R_{12}$ may have an asymmetric structure having different structures, and the cyclopentadiene and the indene may not be linked to each other to form a non-bridge structure.

In the present invention, ions or molecules coordinating with the transition metal (M1 and M2 in Formulae 1 and 2), such as cyclopendadiene linked to $R_1$ to $R_5$ and indene linked to $R_6$ to $R_{12}$ in Formula 1, and indene linked to $R_{13}$ to $R_{18}$ and indene linked to $R_{21}$ to $R_{26}$ are referred to as ligands.

In the present invention, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group, unless otherwise specified.

In addition, the term "hydrocarbon group" means a linear, branched, or cyclic saturated or unsaturated hydrocarbon group, unless otherwise specified, and the alkyl group, the alkenyl group, the alkynyl group, and the like may be linear, branched, or cyclic.

In a specific example, examples of the transition metal compound represented by Formula 1 include transition metal compounds having the following structures and mixtures thereof, but the present invention is not limited thereto.

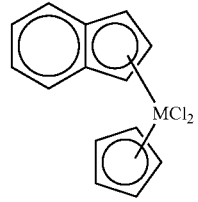

[Formula 1-1]

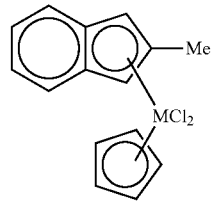

[Formula 1-2]

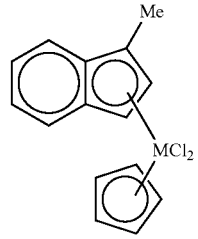

[Formula 1-3]

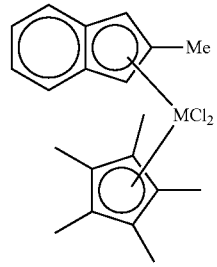

[Formula 1-4]

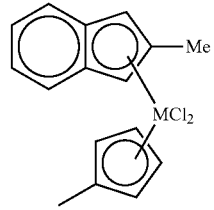

[Formula 1-5]

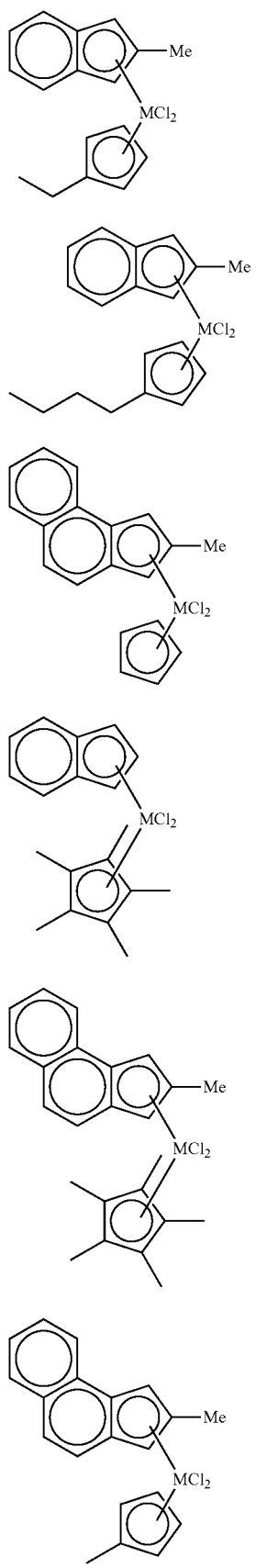
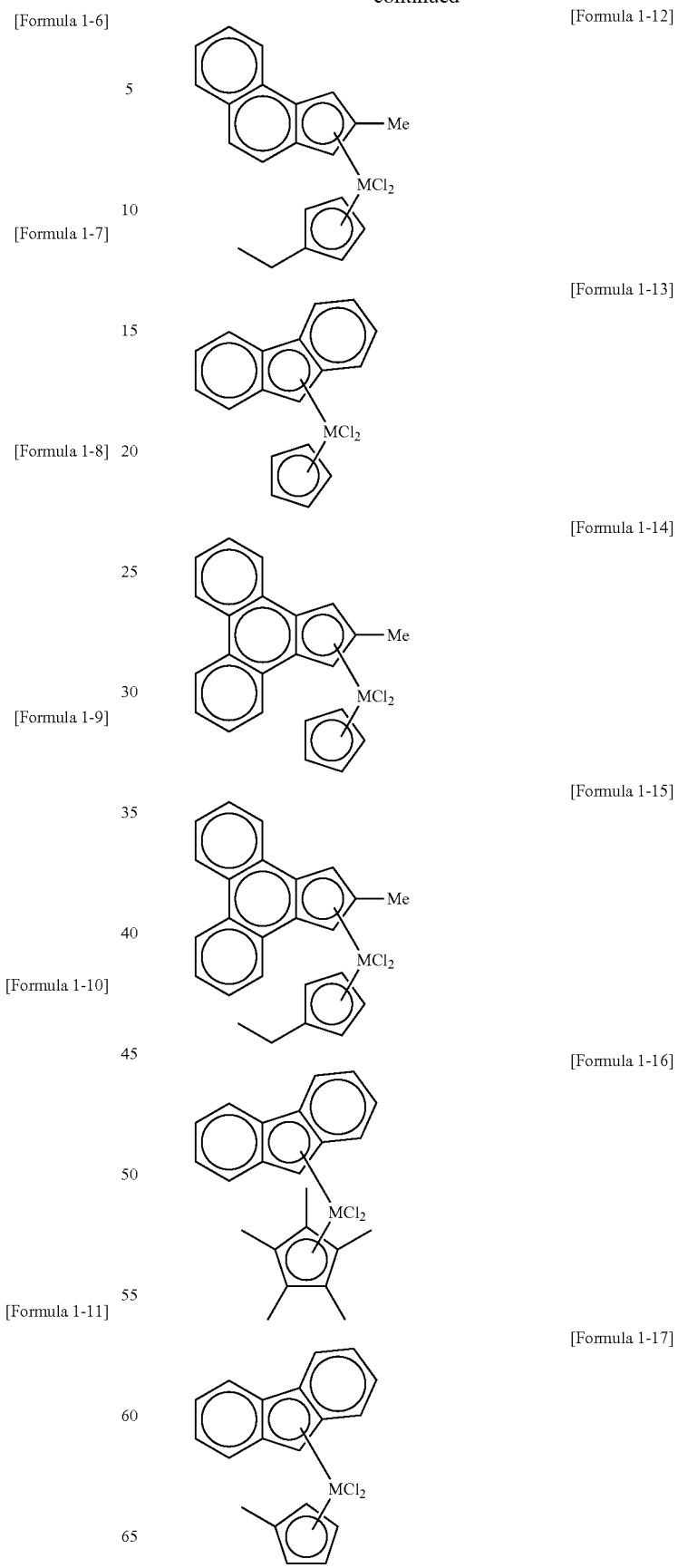

[Formula 1-18]

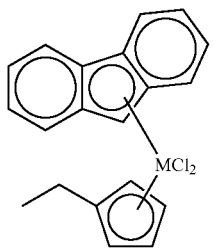

[Formula 1-19]

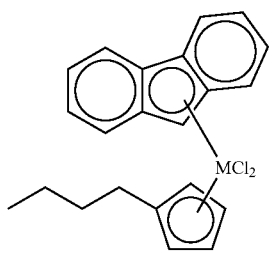

In the transition metal compounds, M is a group 4 transition metal of the periodic table of the elements, such as hafnium (Hf), zirconium (Zr), or titanium (Ti), and Me is a methyl group.

The second metallocene compound, which is a transition metal compound according to the present invention, may be represented by Formula 2 below.

The second metallocene compound serves to exhibit a high mixing rate of comonomer at the hybrid supported catalyst and serves to improve mechanical properties of the produced polymer.

The second metallocene compound has a high mixing rate of comonomer and has characteristics of forming a high molecular weight material and concentrating the distribution of comonomer on the high molecular weight material, thereby improving impact strength, flexural strength, environmental stress cracking resistance, and melt tension. In addition, the second metallocene compound forms a long chain branched structure to improve melt flowability of the high-density polyethylene resin of a high molecular weight.

Since the second metallocene compound has a symmetric structure or an asymmetric structure and a bridge structure having various ligands, the second metallocene compound forms a steric hindrance so that the comonomer easily approaches the catalytic active site, thereby increasing the mixing of the comonomer.

In Formula 2, M2 may be a group 4 transition metal of the periodic table of the elements, $X_3$ and $X_4$ may each independently be one of halogen atoms, $R_{13}$ to $R_{18}$ may each independently be a hydrogen atom, a substituted or unsubstituted $C_1$-$C_{10}$ alkyl group, a substituted or unsubstituted $C_6$-$C_{20}$ aryl group or a substituted or unsubstituted $C_7$-$C_{40}$ alkylaryl group and may be linked to each other to form a ring, $R_{21}$ to $R_{26}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{19}$ and $R_{20}$ may each independently be a substituted or unsubstituted $C_1$-$C_{20}$ alkyl group and may be linked to each other to form a ring, indene linked to $R_{13}$ to $R_{18}$ and indene linked to $R_{21}$ to $R_{26}$ may have the same structure or different structures, and the indene linked to $R_{13}$ to $R_{18}$ and the indene linked to $R_{21}$ to $R_{26}$ may be linked to Si to form a bridge structure.

In the present invention, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group, unless otherwise specified. In addition, the term "hydrocarbon group" means a linear, branched, or cyclic saturated or unsaturated hydrocarbon group, unless otherwise specified, and the alkyl group, the alkenyl group, the alkynyl group, and the like may be linear, branched, or cyclic.

In a specific example, examples of the transition metal compound represented by Formula 2 include transition metal compounds having the following structures and mixtures thereof, but the present invention is not limited thereto.

[Formula 2-1]

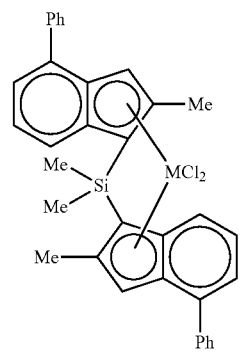

[Formula 2]

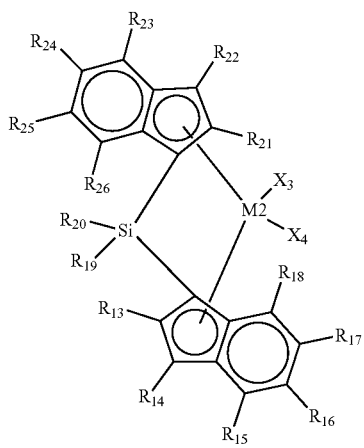

[Formula 2-2]

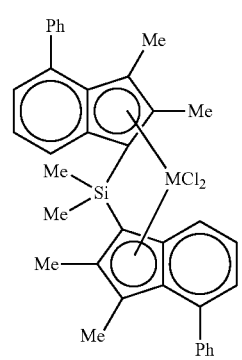

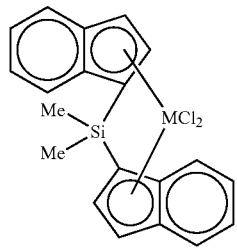
[Formula 2-3]
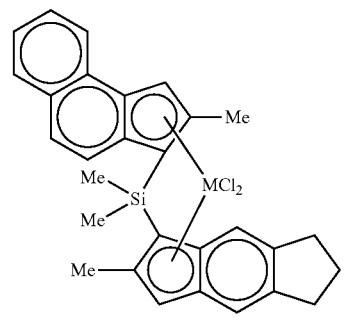
[Formula 2-7]
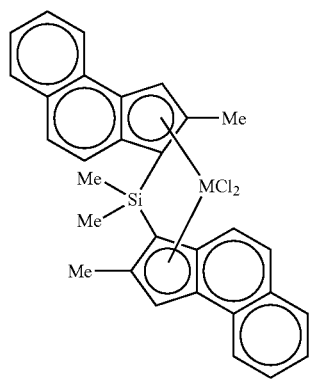
[Formula 2-4]
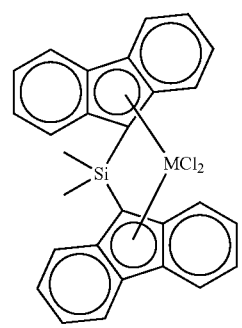
[Formula 2-8]
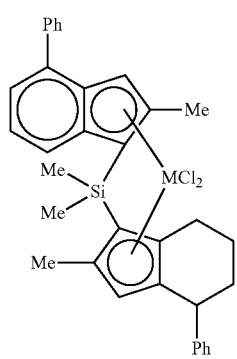
[Formula 2-5]
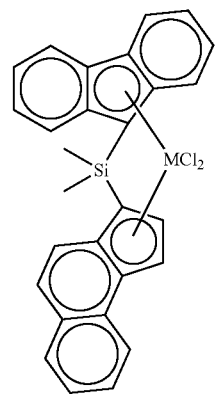
[Formula 2-9]
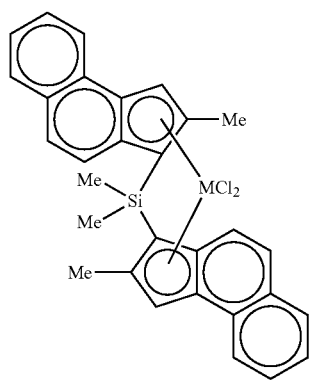
[Formula 2-6]
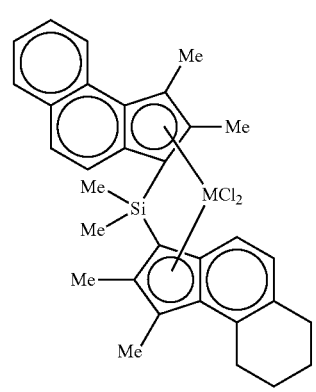
[Formula 2-10]

[Formula 2-11]
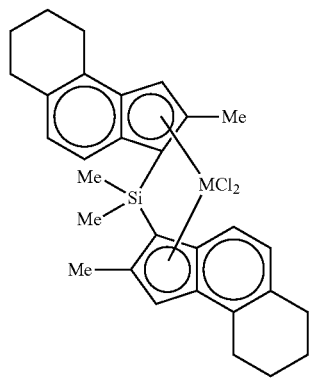
[Formula 2-12]
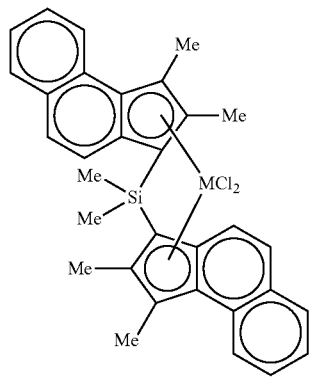
[Formula 2-13]
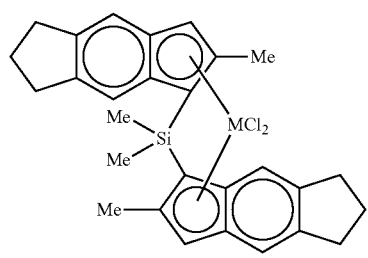
[Formula 2-14]
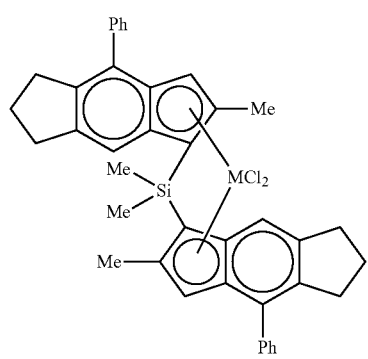
[Formula 2-15]
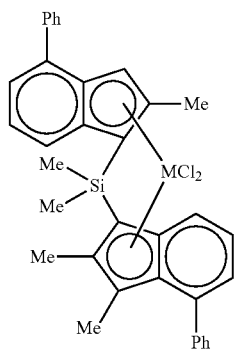
[Formula 2-16]
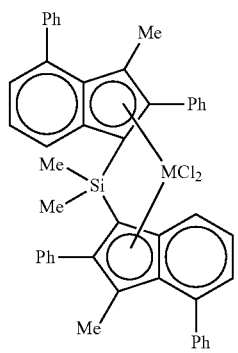
[Formula 2-17]
[Formula 2-18]
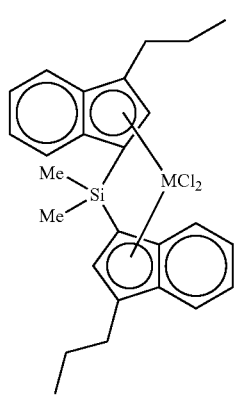

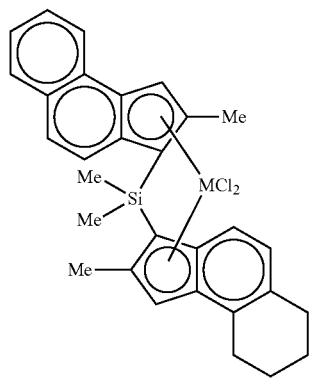
[Formula 2-19]
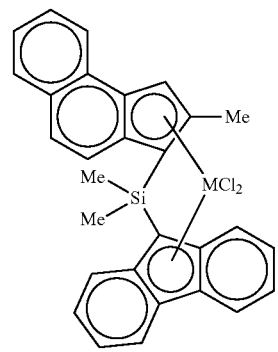
[Formula 2-23]
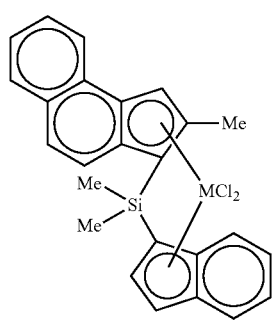
[Formula 2-20]
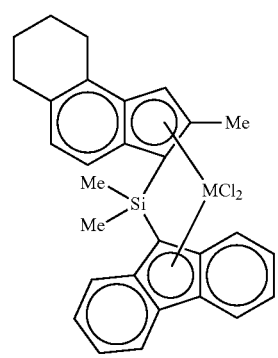
[Formula 2-24]
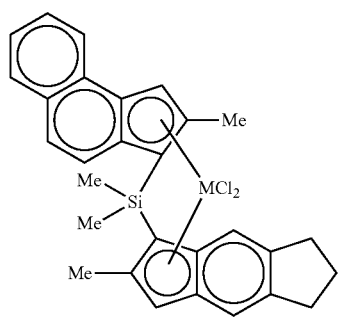
[Formula 2-21]
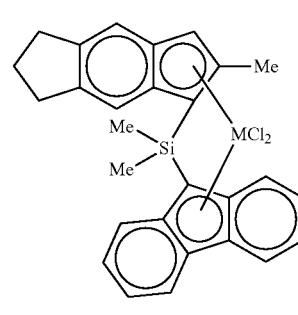
[Formula 2-25]
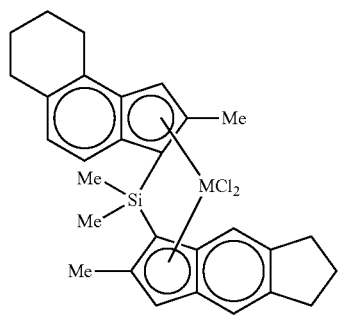
[Formula 2-22]
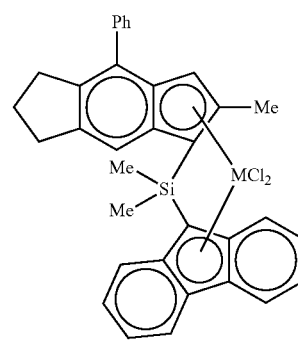
[Formula 2-26]

[Formula 2-27]

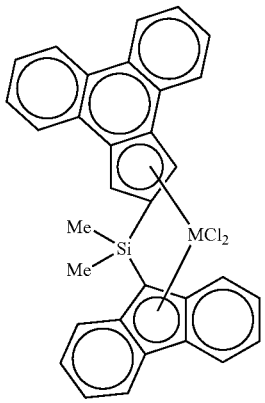

In the transition metal compounds, M is a group 4 transition metal of the periodic table of the elements, such as hafnium (Hf), zirconium (Zr), or titanium (Ti), Me is a methyl group, and Ph is a phenyl group.

The catalyst composition according to the present invention may include a cocatalyst compound including the transition metal compound and at least one compound selected from the group consisting of compounds represented by Formulae 3 to 6 below.

[Formula 3]

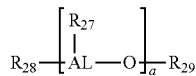

In Formula 3, AL is aluminum, $R_{27}$, $R_{28}$, and $R_{29}$ are each independently a halogen atom, a $C_1$-$C_{20}$ hydrocarbon group, or a hydrocarbon atom substituted with a $C_1$-$C_{20}$ halogen, a is an integer of 2 or more, and Formula 3 is a compound having a repeating unit structure.

[Formula 4]

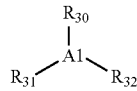

In Formula 4, A1 is aluminum or boron, $R_{30}$, $R_{31}$, and $R_{32}$ are each independently a halogen atom, a $C_1$-$C_{20}$ hydrocarbon group, a hydrocarbon group substituted with a $C_1$-$C_{20}$ halogen, or a $C_1$-$C_{20}$ alkoxy.

[L1-H]$^+$[Z1(A2)$_4$]$^-$   [Formula 5]

[L2]$^+$[Z2(A3)$_4$]$^-$   [Formula 6]

In Formulae 5 and 6, L1 and L2 are neutral or cationic Lewis acids, Z1 and Z2 are group 13 elements of the periodic table of the elements, and A2 and A3 are a substituted or unsubstituted $C_6$-$C_{20}$ aryl group or a substituted or unsubstituted $C_1$-$C_{20}$ alkyl group.

The compound represented by Formula 3 is aluminoxane and is not particularly limited as long as the compound is general alkyl aluminoxane. For example, methylaluminoxane, ethylaluminoxane, isobutylaluminoxane, butylaluminoxane, and the like may be used. Specifically, methylaluminoxane may be used. The alkylaluminoxane may be prepared by a conventional method such as adding an appropriate amount of water to trialkylaluminum or reacting trialkylaluminum with a hydrocarbon compound or an inorganic hydrate salt containing water, and may be obtained in a mixed form of linear and cyclic aluminoxanes.

As the compound represented by Formula 4, for example, a conventional alkyl metal compound may be used. Specifically, trim ethyl aluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri(p-tolyl)aluminum, dimethylaluminum methoxide, dimethylaluminum ethoxide, trimethylboron, triethylboron, triisobutylboron, tripropylboron, tributylboron, tripentafluorophenylboron, and the like may be used. More specifically, trimethylaluminum, triisobutylaluminum, tripentafluorophenylboron, and the like may be used.

Examples of the compound represented by Formula 5 or 6 may include methyldioctateylammonium tetrakis(pentafluorophenyl)borate, trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropyl ammonium tetrakis(p-tolyl)borate, trimethylammonium tetrakis (o,p-dimethylphenyl)borate, triethylammonium tetrakis(o,p-dimethylphenyl)borate, trimethylammonium tetrakis(p-trifluoromethylphenyl)borate, tributylammonium tetrakis(p-trifluoromethylphenyl)borate, tributylammonium tetrakis(pentafluorophenyl)borate, diethylammonium tetrakis(pentafluorophenyl)borate, triphenylphosphonium tetrakis(phenyl)borate, trimethylphosphonium tetrakis(phenyl)borate, N,N-diethylanilinium tetrakis(phenyl)borate, N,N-dimethylanilinium tetrakis(pentafluorophenyl)borate, N,N-diethylaninium tetrakis(pentafluorophenyl)borate, triphenylcarbonium tetrakis(p-trifluoromethylphenyl)borate, triphenylcarbonium tetrakis (pentafluorophenyl)borate, trimethylammonium tetrakis (phenyl)aluminate, triethylammonium tetrakis(phenyl) aluminate, tripropylammonium tetrakis(phenyl)aluminate, tributylammonium tetrakis(phenyl)aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl)aluminate, tributylammonium tetrakis(pentafluorophenyl)aluminate, N,N-diethylaninium tetrakis(phenyl)aluminate, N,N-diethylanilinium tetrakis(phenyl)aluminate, N,N-diethylanilinium tetrakis (pentafluorophenyl)aluminate, diethylammonium tetrakis (pentafluorophenyl)aluminate, triphenylphosphonium tetrakis(phenyl)aluminate, trimethylphosphonium tetrakis (phenyl)aluminate, triethylammonium tetrakis(phenyl) aluminate, and tributylammonium tetrakis(phenyl) aluminate, but the present invention is not limited thereto. Specifically, methyldioctateylammonium tetrakis(pentafluorophenyl)borate ([HNMe(C18H37)2]+[B(C6F5)4]−), N,N-dimethylanilinium tetrakis(pentafluorophenyl)borate, triphenylcarbonium tetrakis(pentafluorophenyl)borate, and the like may be used. Specifically, methyldioctateylammonium tetrakis(pentafluorophenyl)borate ([HNMe(C18H37)2]+[B(C6F5)4]−), N,N-dimethylanilinium tetrakis(pentafluorophenyl)borate, triphenylcarbonium tetrakis(pentafluorophenyl)borate, and the like may be used.

In the production of the hybrid supported metallocene catalyst according to the present invention, a mass ratio of the transition metal (M1 of Formula 1 and M2 of Formula 2) to the carrier in the first and second metallocene compounds is preferably 1:1 to 1:1,000. The mass ratio may be preferably 1:100 to 1:500. When the carrier and the metallocene compound are contained at the above-described mass ratio, appropriate supported catalyst activity is exhibited, which is advantageous in maintaining the activity of the catalyst and achieving cost reduction.

In addition, a mass ratio of the cocatalyst compound represented by Formulae 5 and 6 to the carrier is preferably 1:20 to 20:1, and a mass ratio of the cocatalyst compound represented by Formulae 3 and 4 to the carrier is preferably 1:100 to 100:1.

The mass ratio of the first metallocene compound to the second metallocene compound is preferably 1:100 to 100:1. When the cocatalyst and the metallocene compound are contained at the above-described mass ratio, it is advantageous in maintaining the activity of the catalyst and achieving cost reduction.

As a carrier suitable for the production of the hybrid supported metallocene catalyst according to the present invention, a porous material having a large surface area may be used.

The first and second metallocene compounds and the cocatalyst compound may be a supported catalyst that is hybrid-supported on the carrier and used as the catalyst. The supported catalyst refers to a catalyst that is well dispersed so as to improve catalyst activity and maintain stability and is supported on a carrier for stable maintenance.

The hybrid support refers to not supporting the first and second metallocene compounds on the carriers but supporting the catalyst compound on the carrier in one step. Due to the reduction in production time and the reduction in amount of a solvent used, the hybrid support may be said to be much more cost-effective than individual supports.

The carrier is a solid that disperses and stably retains a material having a catalytic function, and is usually a material having a large porosity or a large area so as to be highly dispersed and supported to increase the exposed surface area of the material having the catalytic function. The carrier has to be stable mechanically, thermally, and chemically. Examples of the carrier include silica, alumina, titanium oxide, zeolite, zinc oxide, starch, and synthetic polymer, but the present invention is not limited thereto.

The carrier may have an average particle size of 10 microns to 250 microns, preferably 10 microns to 150 microns, and more preferably 20 microns to 100 microns.

The carrier may have a microporous volume of 0.1 cc/g to 10 cc/g, preferably 0.5 cc/g to 5 cc/g, and more preferably 1.0 cc/g to 3.0 cc/g.

In addition, the carrier may have a specific surface area of 1 $m^2$/g to 1,000 $m^2$/g, preferably 100 $m^2$/g to 800 $m^2$/g, and more preferably 200 $m^2$/g to 600 $m^2$/g.

When the carrier is silica, silica may have a drying temperature of 200° C. to 900° C. The drying temperature may be preferably 300° C. to 800° C., and more preferably 400° C. to 700° C. When the drying temperature is less than 200° C., too much moisture causes surface moisture to react with the cocatalyst. When the drying temperature exceeds 900° C., the structure of the catalyst collapses.

The concentration of the hydroxyl group in the dried silica may be 0.1 mmol/g to 5 mmol/g, preferably from 0.7 mmol/g to 4 mmol/g, and more preferably 1.0 mmol/g to 2 mmol/g. When the concentration of the hydroxyl group is less than 0.5 mmol/g, the supported amount of the cocatalyst is lowered, and when the concentration of the hydroxyl group exceeds 5 mmol/g, the catalyst component is inactivated, which is not preferable.

The hybrid supported metallocene catalyst according to the present invention may be produced by activating the metallocene catalyst and supporting the activated metallocene catalyst on the carrier. In the production of the hybrid supported metallocene, the cocatalyst may be first supported on the carrier. The activation of the metallocene catalyst may be independently performed and may vary depending on the situation. That is, the first metallocene compound and the second metallocene compound may be mixed, activated, and then supported on the carrier. The first metallocene compound and the second metallocene compound may be supported after the cocatalyst compound is supported on the carrier.

Examples of the solvent of the reaction in the production of the hybrid supported metallocene catalyst include an aliphatic hydrocarbon solvent such as hexane or pentane, an aromatic hydrocarbon solvent such as toluene or benzene, a hydrocarbon solvent substituted with a chlorine atom, such as dichloromethane, an ether-based solvent such as diethyl ether or tetrahydrofuran, and most organic solvents such as acetone or ethyl acetate. Toluene or hexane is preferable, but the present invention is not limited thereto.

The reaction temperature in the production of the catalyst is 0° C. to 100° C., and preferably 25° C. to 70° C., but the present invention is not limited thereto.

In addition, the reaction time in the production of the catalyst is 3 minutes to 48 hours, and preferably 5 minutes to 24 hours, but the present invention is not limited thereto.

The first and second metallocene compounds may be activated by mixing (contacting) the cocatalyst compound. The mixing may be performed in an inert atmosphere, typically a nitrogen or argon atmosphere, without using a solvent, or in the presence of the hydrocarbon solvent.

In addition, the temperature in the activation of the first and second metallocene compounds may be 0° C. to 100° C., and preferably 10° C. to 30° C.

When the first and second metallocene compounds are activated with the cocatalyst compound, the stirring time may be 5 minutes to 24 hours, and preferably 30 minutes to 3 hours.

In the first and second metallocene compounds, the catalyst composition in a solution state, which is uniformly dissolved in the hydrocarbon solvent or the like, is used as it is. Alternatively, the first and second metallocene compound may be used in a solid powder state in which the solvent is removed and vacuum drying is performed for 20° C. to 200° C. for 1 hour to 48 hours. However, the present invention is not limited thereto.

The method for producing the high-density ethylene-based polymer according to the present invention includes preparing a polyolefin homopolymer or an ethylene-based copolymer by contacting the hybrid supported metallocene catalyst with at least one olefin monomer.

The method (polymerization reaction) for producing the high-density ethylene-based polymer according to the present invention may perform a polymerization reaction in a slurry phase using an autoclave reactor or a gas phase using a gas phase polymerization reactor. In addition, the respective polymerization reaction conditions may be variously modified according to the desired polymerization result of the polymerization method (slurry phase polymerization, gas phase polymerization) or the form of the polymer. The degree of the modification thereof may be easily performed by those of ordinary skill in the art.

When the polymerization is performed in a liquid phase or a slurry phase, a solvent or olefin itself may be used as a medium. Examples of the solvent may include propane, butane, pentane, hexane, octane, decane, dodecane, cyclopentane, methylcyclopentane, cyclohexane, methylcyclohexane, benzene, toluene, xylene, dichloromethane, chloroethane, dichloroethane, and chlorobenzene, and these solvents may be mixed at a predetermined ratio, but the present invention is not limited thereto.

In a specific example, examples of the olefin monomer may include ethylene, α-olefins, cyclic olefins, dienes, trienes, and styrenes, but the present invention is not limited thereto.

The α-olefins include a $C_3$-$C_{12}$ (for example, $C_3$-$C_8$) aliphatic olefin. Specific examples of the α-olefins may include propylene, 1-butene, 1-pentene, 3-methyl-1-butene, 1-hexene, 4-methyl-1-pentene, 3-methyl-1-pentene, 1-hexene, 1-heptene, 1-octene, 1-decene, 1-undecene, 1-dodecene, 1-tetradecene, 1-hexadecene, 1-aitosen, 4,4-dimethyl-1-pentene, 4,4-diethyl-1-hexene, and 3,4-dimethyl-1-hexene.

The α-olefins may be homopolymerized, or two or more olefins may be alternating, random, or block copolymerized. The copolymerization of the α-olefins may include copolymerization of ethylene and a $C_3$-$C_{12}$ (for example, $C_3$-$C_8$) α-olefin (specifically, ethylene and propylene, ethylene and 1-butene, ethylene and 1-hexene, ethylene and 4-methyl-1-pentene, ethylene and 1-octene, or the like) and copolymerization of propylene and a $C_4$-$C_{12}$ (for example, $C_4$-$C_8$) α-olefins (specifically, propylene and 1-butene, propylene and 4-methyl-1-pentene, propylene and 4-methyl-butene, propylene and 1-hexene, propylene and 1-octene, or the like). In the copolymerization of ethylene or propylene and another α-olefin, the amount of the other α-olefin may be 99 mol % or less of the total monomer, and preferably 80 mol % or less in the case of the ethylene copolymer.

Preferable examples of the olefin monomer may include ethylene, propylene, 1-butene, 1-hexene, 1-octene, 1-decene, or mixtures thereof, but the present invention is not limited thereto.

In the method for producing the high-density ethylene-based polymer according to the present invention, the amount of the catalyst composition used is not particularly limited. For example, in the polymerization reaction system, the central metal of the transition metal compound (M, group 4 transition metal) represented by Formulae 1 and 2 may have a concentration of $1\times10^{-5}$ mol/l to $9\times10^{-5}$ mol/l.

The central metal concentration affects the activity of the catalyst and the physical properties of the high-density ethylene-based polymer. When the central metal concentration of the first metallocene compound exceeds the above-described numerical range, the activity increases but the mechanical properties of the resin decreases. When the central metal concentration of the first metallocene compound is lower than the above-described numerical range, the activity decreases and the processability also decreases. Therefore, it is cost-ineffective. In addition, since the generation of static electricity increases in the gas phase reactor, stable operations are impossible.

In addition, when the central metal concentration of the second metallocene compound exceeds the above-described numerical range, the activity decreases and the physical properties increases, but the processability is lowered. When the central metal concentration of the second metallocene compound is less than the above-described numerical range, the activity increases but the mechanical properties decrease.

In addition, the temperature and pressure at the time of polymerization may be changed according to the reactant, the reaction condition, and the like, and are thus not particularly limited. However, in the case of the solution polymerization, the polymerization temperature may be 0° C. to 200° C., and preferably 100° C. to 180° C., and in the case of the slurry phase or gas phase polymerization, the polymerization temperature may be 0° C. to 120° C., and preferably 60° C. to 100° C.

In addition, the polymerization pressure may be 1 bar to 150 bar, preferably 30 bar to 90 bar, and more preferably 10 bar to 20 bar. The pressure may be applied by injecting an olefin monomer gas (for example, ethylene gas).

For example, the polymerization may be performed in a batch manner (for example, autoclave reactor) or a semi-continuous or continuous manner (for example, gas phase polymerization reactor). The polymerization may also be performed in two or more steps having different reaction conditions, and the molecular weight of the final polymer may be controlled by changing the polymerization temperature or injecting hydrogen into a reactor.

The high-density ethylene-based polymer according to the present invention may be obtained by ethylene homopolymerization or copolymerization of ethylene and α-olefin using the hybrid supported metallocene compound as the catalyst and has a unimodal distribution.

Hereinafter, the high-density ethylene-based polymer according to the present invention will be described in detail.

The high-density ethylene-based polymer according to the present invention may have a density of 0.930 g/cm³ to 0.970 g/cm³, and more preferably 0.950 g/cm³ to 0.965 g/cm³. When the density of the polymer is 0.930 g/cm3 or less, the polymer may not exhibit sufficiently high toughness. When the density of the polymer is 0.970 g/cm³ or more, it is not preferable since the degree of crystallization becomes excessively large and brittle fracture easily occurs in a molded product.

Generally, when a melt index (MI) increases, moldability is improved, but impact resistance is deteriorated. On the contrary, when the MI is lowered, impact resistance and chemical resistance are improved, but melt flowability is deteriorated and moldability is significantly deteriorated.

For this reason, in the case of increasing the MI so as to improve the moldability, a method is used which forms a short chain branched structure (reduction in density) through general copolymerization so as to prevent deterioration of impact resistance. However, since the reduction in the density of the ethylene-based polymer leads to deterioration of the toughness of the polymer, there is a limitation in a method for compensating impact resistance due to the reduction in density.

The melt flowability used herein mainly corresponds to an extrusion load at the time of extruding a molten resin from an extruder and has a close relationship (proportionality) with injection molding (moldability). MI, MFI, MFR, or the like is used as an index for the standard of the melt flowability. In the present invention, the MI (melt index) indicates flowability in a load of 2.16 kg at 190° C., and the MFI indicates flowability in a load of 21.6 kg at 190° C. The MFR indicates a ratio of MFI to MI, that is, MFI/MI.

The high-density ethylene-based polymer according to the present invention may have an MI of 0.1 g/10 min to 10 g/10 min, and preferably 0.5 g/10 min to 10 g/10 min. When the MI is less than 0.1 g/10 min, molding processability is significantly deteriorated when the polymer is used as an injection molding material, and the appearance of the injection-molded product is poor. When the MI is greater than 10 g/10 min, the impact resistance is significantly lowered.

Unlike the conventional high-density polyethylene polymer, the high-density polyethylene polymer according to the present invention has a low MI, which can exhibit excellent impact resistance and chemical resistance, and also has a wide molecular weight distribution and a long chain branch, which can exhibit excellent injection moldability.

The high-density ethylene-based polymer according to the present invention may have an MFR of 35 to 100, and more preferably 37 to 80. When the MFR is less than 35, molding processability is significantly deteriorated when the polymer is used as an injection molding material. When the MFR is greater than 100, mechanical properties are deteriorated.

FIG. 1 shows hardening stiffness measured at 25° C. and 80° C. respectively. The hardening stiffness represents environmental stress cracking resistance, which can reduce the measurement time and improve the reliability of the result value, as compared with existing bent strip test (BST) and full notch creep test (FNCT) methods. This hardening stiffness can be derived by calculating a slope of a strain hardening portion based on a drawing region in a stress-strain curve obtained through a tensile test. The strain hardening portion is a portion in which a crystal structure of a material changes. At this time, resistance to external forces is generated by chain entanglement and tie-molecule existing in an amorphous region of the material. Therefore, the hardening stiffness is affected by the degree of chain entanglement and the concentration of tie-molecule in the amorphous region of the material. The degree of entanglement of the amorphous region tends to increase as the molecular weight, molecular weight distribution, short chain branch, and long chain branch of the material increase.

Therefore, the environmental stress cracking is a fracture phenomenon that occurs when the entanglement between lamellae in the amorphous region is released by an external force. The hardening stiffness reflects the environmental stress cracking resistance that is resistant to the environmental stress cracking.

In FIG. 1 and Table 2, the hardening stiffness measured at 25° C. was 0.41 in Example 1, 0.44 in Example 2, and 0.42 in Example 3, and the hardening stiffness measured at 80° C. was 0.040 in Example 1, 0.045 in Example 2, and 0.040 in Example 3. It can be confirmed that Examples (1 to 3) have higher hardening stiffness than those of Comparative Examples (1 to 3). The hardening stiffness according to Examples is in the range of 0.40 to 0.50 at 25° C. and in the range of 0.040 to 0.050 at 80° C.

It can be seen from FIG. 1 and Table 2 that Examples require a larger stress as strain increases in the strain hardening, as compared with Comparative Examples. This shows that Examples have higher environmental stress cracking resistance and long-term pressure resistance characteristics than those of Comparative Examples.

At this time, the environmental stress cracking resistance means resistance to external force causing stress cracking as described above. As the molecular weight distribution is wider or more long chain branch (LCB) and short chain branch (SCB) are included, the entanglement in the amorphous region increases and thus the environmental stress cracking resistance increases.

Since the hybrid supported catalyst according to the present invention includes the second metallocene compound as described above, the production of the long chain branch can be induced in the produced high-density ethylene-based polymer. Therefore, a high-density ethylene-based polymer including a long chain branch (LCB) having a branch having 6 or more carbon atoms in a main chain can be produced.

Since the long chain branch (LCB) causes physical effects to fill an empty space between polymers, it is known to affect the viscosity and elasticity of the molten polymer. When the long chain branch in the polymer chain is increased and the entanglement of the polymer chain is strengthened, intrinsic viscosity at the same molecular weight is lowered. Therefore, low load is formed on the screw during extrusion and injection, thereby increasing processability. Since the high-density polyethylene resin according to the present invention has a low MI but includes a lot of long chain branches, the hardening stiffness is high, and thus, the long-term pressure resistance characteristics and processability are more excellent than the conventional polyethylene resin.

Figure 2:
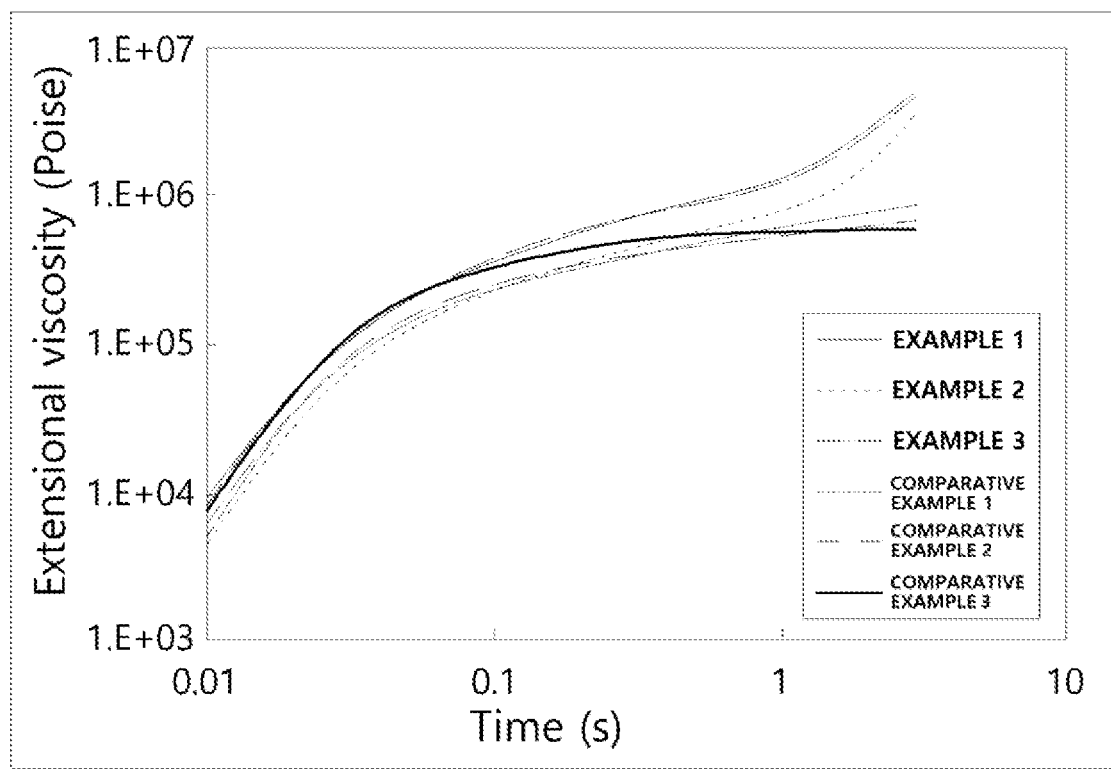
FIG. 2 is a graph showing extensional viscosity of Examples 1 to 3 and Comparative Examples 1 to 3.

FIG. 2 is a graph showing extensional viscosity of Examples 1 to 3 and Comparative Examples 1 to 3. It can be confirmed that Examples 1 to 3 have higher extensional thickening than Comparative Examples 1 to 3 at 150° C. at a strain rate of 1 (1/s) when strain rate*time (=strain) is fixed to 3.

The extensional thickening refers to a phenomenon of a fluid in which an extensional viscosity increases as a strain rate (or time) increases. The extensional thickening is a concept of a fluid opposed to extensional thinning in which extensional viscosity decreases as a strain rate (or time) increases.

In the present invention, in order to more clearly quantify the characteristics of the pipe using the ethylene-based polymer in the rheological properties, the extensional viscosity shown in FIG. 2 was obtained using Hencky strain.

The rheological properties are the properties of flow and deformation of materials. The flow and deformation of materials in the process of producing products have a decisive influence on the properties of the products. The unique properties of the material when the material flows and deforms are the rheological properties. A rheological property measurement method obtains a material function by measuring stress caused by applying strain.

A relationship between Hencky strain (εH) and sample length (L) according to time (t) can be expressed by Equation 1 below.

$$\varepsilon_H(t) = \dot{\varepsilon} t = \ln L(t)/L_0 \qquad \text{[Equation 1]}$$

εH: Hencky strain
$\dot{\varepsilon}$: Hencky strain rate (1/s)
$L_0$: initial sample length
L: current sample length
t: time in seconds Hencky strain shows a more accurate strain as a change in extensional length is used in obtaining it. Hencky strain can be used to measure the rheological properties of the pipe using the ethylene-based polymer according to the present invention.

Figure 3:
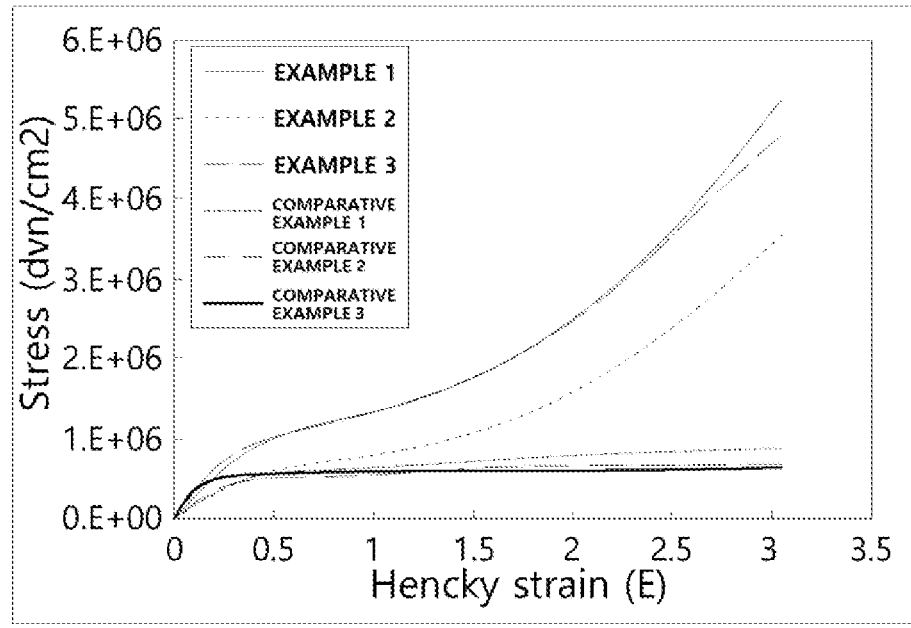
FIG. 3 is a graph showing stress of Examples 1 to 3 and Comparative Examples 1 to 3 according to Hencky strain.

FIG. 3 is a graph showing comparison of rheological properties between the pipe using the ethylene-based polymer according to Examples 1 to 3 and commercial products. In Table 3, the increased ratios based on strain of 3 are 0.5, 1.0, 1.5, 2.0, 2.5, and 3.0 and stresses required for each strain are shown. In FIG. 3, as the stress value according to the Hencky strain increases, it means that there are many long chain branches. In general, when the long chain branch is included, mechanical properties are deteriorated. However, referring to FIG. 1 and Table 2 below, it can be confirmed that the high-density ethylene-based polymer according to the present invention exhibits superior strain hardening and thus has excellent long-term pressure resistance characteristics even when the high-density ethylene-based polymer contains long chain branches.

FIG. 3 is a graph showing stress measured while increasing the Hencky strain, which is the unit of strain. When the strain rate is 1 (1/s) and the Hencky strain is 3, the stress is 5,252,393.0 dyn/cm$^2$ in Example 1, 3,549,639.8 dyn/cm$^2$ in Example 2, and 4,827,452.5 dyn/cm$^2$ in Example 3.

In relation to the rheological properties of the present invention, the stress (strain according to strain) may be 3,000,000 dyn/cm$^2$ to 10,000,000 dyn/cm$^2$ at Hencky strain (strain) of 3, at which the stress becomes significantly different from Comparative Examples 1 to 3.

Figure 4:
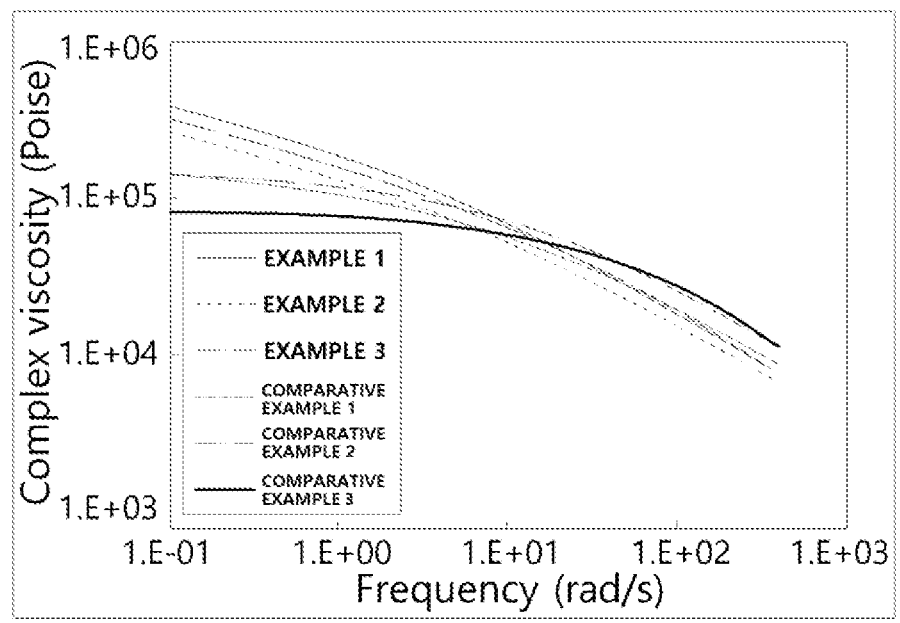
FIG. 4 is a graph showing complex viscosity of Examples 1 to 3 and Comparative Examples 1 to 3.

FIG. 4 is a graph showing complex viscosity of Examples 1 to 3 and Comparative Examples 1 to 3. x-axis represents frequency (rad/s) and y-axis represents complex viscosity (Poise). This graph is related to flowability. As the complex viscosity is higher at lower frequency and is lower at higher frequency, the flowability is great. This is said that a shear thinning phenomenon is great. Although the ethylene-based polymer according to the present invention has a low MI as compared with Comparative Examples 1 to 3, it shows a remarkably excellent melt flowability due to a high shear thinning phenomenon. Therefore, it can be seen that the shear thinning effect is much better than that of the high-density ethylene-based polymer having a similar MI in the MI range of the present invention, preferably 0.1 g/10 min to 10 g/10 min, thereby showing excellent flowability and processability.

The complex viscosity (Poise) graph of FIG. 4 according to the frequency (rad/s) may be represented by fitting power law of Equation 2 below. As the complex viscosity is higher at lower frequency, the mechanical properties are better. As the complex viscosity is lower at higher frequency, the processability is better. Therefore, as the C$_2$ value is smaller, that is, as the negative slope of the graph is greater, the flowability is more excellent. The ethylene-based polymer according to the present invention is has a C$_2$ value in a range of −0.5 to −0.4 as shown in Table 5. Therefore, despite the low MI as compared with Comparative Examples 1 to 3 that are the conventional ethylene-based polymers, the viscosity decreases toward the high frequency region due to the high shear thinning effect, and it can be seen that the processability is excellent.

$$y = c_1 x^{c_2} \quad \text{[Equation 2]}$$

x: frequency (rad/s)
y: complex viscosity (Poise)
$c_1$: consistency index
$c_2$: CV index (slope of graph)
$c_2 = n-1$, n=flow behavior index
n→0, shear thinning behavior (non-Newtonian behavior)
n→1, Newtonian behavior In the case of purely viscous liquids, a relationship between shear stress and shear strain is linear, thus showing a constant viscosity regardless of shear rate. This is called Newtonian behavior. However, the polymer has viscoelasticity, which is intermediate between a fully elastic material and a viscous liquid in a molten state. This causes a shear thinning phenomenon in which when shear stress is applied in the molten state, the strain is not proportional to the shear stress and the viscosity of the polymer decreases as the shear rate increases. This is called non-Newtonian behavior. When shear stress is slowly applied to the polymer having high viscosity, the viscosity of the polymer is constant because the polymer resists the applied stress, and when stress is above the yield stress, particles are rearranged to flow well. Thus, the viscosity of the polymer is lowered. This property is important in determining the molding method of the polymer.

By fitting a complex viscosity (Poise) graph according to frequency (rad/s) to Equation 2, TA Orchestrator, TA which is an ARES measurement program of TA Instruments, can be used.

Figure 5:
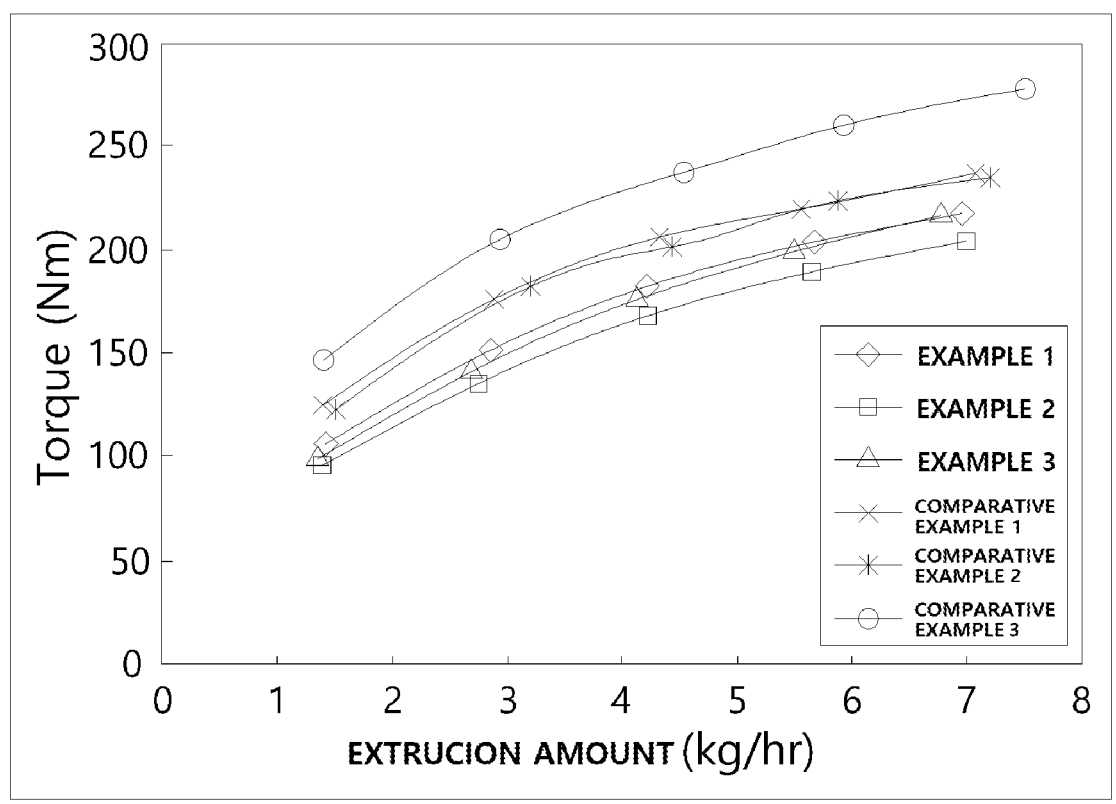
FIG. 5 is a graph showing an extrusion load (torque) of Examples 1 to 3 and Comparative Examples 1 to 3 according to an extrusion amount.

FIG. 5 is a graph showing an extrusion load (torque) of Examples 1 to 3 and Comparative Examples 1 to 3 according to an extrusion amount. In general, in order to improve processability, the MI is increased or the molecular weight distribution is increased. However, the ethylene-based polymer according to the present invention has a low viscosity during processing in spite of low MI, and thus has a low extrusion load on a screw during extrusion or injection processing, thereby enabling high-speed production. That is, in the same amount of extrusion, Examples 1 to 3 according to the present invention have a lower extrusion load than Comparative Examples 1 to 3, thereby enabling high-speed production.

The presence or absence of long chain branch in the ethylene-based polymer may be determined whether an inflection point is present on a van Gurp-Palmen graph measured using a rheometer or whether complex modulus (G*) tends to diverge as the size gets smaller.

Figure 6:
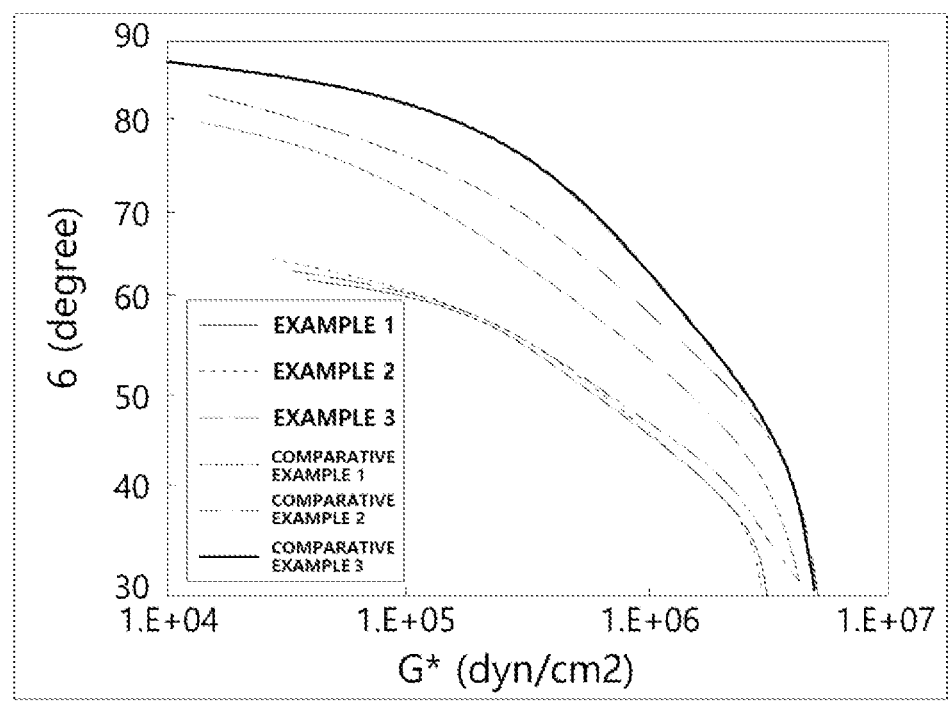
FIG. 6 is a van Gurp-Palmen graph of Examples 1 to 3 and Comparative Examples 1 to 3.

Referring to the van Gurp-Palmen graph of Examples 1 to 3 and Comparative Examples 1 to 3 shown in FIG. 6, as the complex modulus value of the x-axis decreases, the phase angle of the y-axis diverges, and as the complex modulus value increases, the graph has the inflection point. These characteristics of the graph can confirm that a lot of long chain branches are contained in the ethylene-based polymer.

In general, when the MI is low, the mechanical properties can be improved, but the melt flowability is deteriorated, thus degrading the processability. The high-density ethylene-based polymer according to the present invention has low MI and thus has excellent mechanical strength. In addition, as shown in FIG. 1, as compared with other ethylene-based polymers having a similar density, the high-density ethylene-based polymer according to the present invention has high hardening stiffness and thus has relatively excellent environmental stress cracking resistance.

Furthermore, since the high-density ethylene-based polymer according to the present invention contains the long chain branch, the high-density ethylene-based polymer according to the present invention has high strain hardening and Hencky strain in spite of low MI. Therefore, as compared with the pipe using the conventional high-density ethylene-based polymer, the pipe according to the present invention can have excellent pipe characteristics in terms of long-term pressure resistance and moldability.

The high-density ethylene-based polymer according to the present invention can be used as injection, compression and rotational molding materials.

EXAMPLES

Hereinafter, the structure and operation of the present invention will be described in more detail with reference to preferred examples of the present invention. However, these example are shown by way of illustration and should not be construed as limiting the present invention in any way.

Since contents not described herein can be sufficiently technically inferred by those of ordinary skill in the art, descriptions thereof will be omitted.

1. Manufacture Example of First Metallocene Compound

Indene (5 g, 0.043 mol) was dissolved in hexane (150 ml). The mixture was sufficiently mixed and cooled to a temperature of −30° C. 2.5M n-butyllithium (n-BuLi) hexane solution (17 ml, 0.043 mol) was slowly dropped to the hexane solution and stirred at room temperature for 12 hours. A white suspension was filtered through a glass filter, and a white solid was sufficiently dried to obtain an indene lithium salt (yield: 99%).

In a slurry solution of the indene lithium salt (1.05 g, 8.53 mmol), CpZrCl3 (2.24 g, 8.53 mmol) was slowly dissolved in ether (30 mL) and then cooled to a temperature of −30° C. An indene lithium salt dissolved in ether (15 mL) was slowly dropped to the ether solution and stirred for 24 hours to obtain [indenyl(cyclopentadienyl)]ZrCl2 (yield: 97%). Here, Cp indicates cyclopentadienyl.

2. Manufacture Example of Second Metallocene Compound

Manufacture Example of Ligand Compound 2-methyl-4-bromo indene (2 g, 1 eq), Pd(PPh3)4 (553 mg, 0.05 eq), and 1-NaphB(OH)2 (2.14 g, 1.3 eq) were added to a solution of tetrahydrofuran (THF) and MeOH (4:1, 40 ml), and degassed K2CO3 aqueous solution (2.0 M, 3.3 eq) was added thereto at room temperature. The mixture was stirred under reflux at a temperature of 80° C. for 12 hours to obtain 2-methyl-4-(1-naphthyl)indene. 2-methyl-4-(1-naphthyl)indene was added to 50 mL of toluene, and n-BuLi (7.8 mL, 1.1 eq, 1.6 M in hexane) was slowly added thereto at a temperature of −30° C. The mixture was gradually heated to room temperature and stirred for 12 hours. A solid generated therefrom was filtered, washed with hexane, and dried under vacuum to obtain 2-methyl-4-(1-naphthyl)indenyl lithium.

SiMe2Cl2 (462 mg, 1 eq) was slowly added to 2-methyl-4-(1-naphthyl)indenyl lithium (1.88 g, 2 eq), 13 mL of toluene, and 3 mL of THF at a temperature of −30° C., and the mixture was gradually heated and stirred at a temperature of 55° C. for 12 hours to obtain 1.97 g (97%) of dimethylbis{2-methyl-4-(1-naphthyl)indenyl)}silane.

Manufacture Example of Second Metallocene Compound

The compound (0.4 g, 1 eq) produced in Manufacture Example was added to 15 mL of THF, and n-BuLi (1.32 mL, 2.2 eq, 1.6 M in hexane) was slowly added thereto at a temperature of −30° C. The mixture was gradually heated to room temperature and stirred for 12 hours to obtain dilithium salt. ZrCl4 (435 mg, 1 eq) was slowly added to a dilithium salt slurry solution and stirred for 12 hours. A solvent was removed therefrom under vacuum, and a product obtained therefrom was washed with THF and MC to obtain Me2Si {2-methyl-4-(1-naphthyl)}2ZrCl2 (yield: 94%).

3. Manufacture Example of Hybrid Supported Metallocene Catalyst

The first and second metallocene compounds and methylaluminoxane (MAO) as the cocatalyst lost activity when reacted with moisture or oxygen in the air. Therefore, all experiments were performed under a nitrogen condition by using a glove box and a Schlenk technique. A 10 L supported catalyst reactor was washed to remove foreign matter therefrom. The 10 L supported catalyst reactor was closed while drying at a temperature of 110° C. for 3 hours or more and was then in a state in which moisture or the like was completely removed using a vacuum.

10 wt % of methylalumoxane (MAO) solution (methylaluminoxane: 1,188 g) was added to 2.862 g of the compound produced in Manufacture Example and 3.469 g of the compound produced in Manufacture Example, and the mixture was stirred at room temperature for 1 hour. After 300 g of silica (XPO2402) was added to the reactor, 900 mL of purified toluene was added to the reactor and then stirred. After the stirring step for 1 hour was completed, a first metallocene compound, a second metallocene compound, and a methylaluminoxane mixed solution were added to the reactor while stirring the reactor. The reactor was heated to a temperature of 60° C. and stirred for 2 hours.

After a precipitation reaction, a supernatant was removed, washed with 1 L of toluene, and vacuum-dried at a temperature of 60° C. for 12 hours.

Example 1

An olefin polymer was produced by adding the supported hybrid metallocene catalyst obtained in Manufacture Example to a continuous polymerization reactor for a fluidized bed gas process. 1-hexene was used as a comonomer, a 1-hexene/ethylene mole ratio was 0.299%, a reactor ethylene pressure was maintained at 15 bar, a hydrogen/ethylene mole ratio was 0.106%, and a polymerization temperature was maintained at 80° C. to 90° C.

Example 2

An olefin polymer was produced by adding the supported hybrid metallocene catalyst obtained in Manufacture Example to a continuous polymerization reactor for a fluidized bed gas process. 1-hexene was used as a comonomer, a 1-hexene/ethylene mole ratio was 0.302%, a reactor ethylene pressure was maintained at 15.2 bar, a hydrogen/ethylene mole ratio was 0.097%, and a polymerization temperature was maintained at 80° C. to 90° C.

Example 3

An olefin polymer was produced by adding the supported hybrid metallocene catalyst obtained in Manufacture Example to a continuous polymerization reactor for a fluidized bed gas process. 1-hexene was used as a comonomer, a 1-hexene/ethylene mole ratio was 0.305%, a reactor ethylene pressure was maintained at 15 bar, a hydrogen/ethylene mole ratio was 0.101%, and a polymerization temperature was maintained at 80° C. to 90° C.

Comparative Example 1

A commercial product HDPE SP988 (manufactured by LG Chem, Ltd) was used.

Comparative Example 1 has a density of 0.9426 g/cm$^3$ according to ASTM D1505 and a melt index (MI) of 0.69 g/10 min according to ASTM D1238.

Comparative Example 2

A commercial product HDPE DX900 (manufactured by SK Global Chemical Co., Ltd) was used.

Comparative Example 2 has a density of 0.9384 g/cm$^3$ according to ASTM D1505 and a melt index (MI) of 0.63 g/10 min according to ASTM D1238.

Comparative Example 3

A commercial product HDPE M3707AN (manufactured by Hanwha Chemical Corp.) was used.

Comparative Example 3 has a density of 0.937 g/cm$^3$ according to ASTM D1505 and a melt index (MI) of 0.93 g/10 min according to ASTM D1238.

<Physical Property Measurement Method>
1) A density was measured according to ASTM D1505.
2) MI and MFR Melt flowability MI was an amount of extrusion for 10 minutes at a load of 2.16 kg and was measured at a measurement temperature of 190° C. according to ASTM D1238. MFI indicates a ratio of MFI to MI, i.e., MFI/MI. MFI was an amount of extrusion for 10 minutes at a load of 21.6 kg and was measured at a measurement temperature of 190° C. according to ASTM D1238.

3) Polydispersity (PDI) indicates a ratio of Mw to Mn, i.e., Mw/Mn.

4) Hardening stiffness was obtained by measuring a slope of a strain hardening portion based on a drawing region in a stress-strain curve obtained by performing a uniaxial tensile test at 25° C. and 80° C. respectively.

Table 1 shows the polymerization conditions of Examples 1 to 3.

TABLE 1

| | Ethylene pressure (bar) | Hydrogen/ethylene mole ratio (%) | 1-hexene/ethylene mole ratio (%) |
|---|---|---|---|
| Example 1 | 15.0 | 0.106 | 0.299 |
| Example 2 | 15.2 | 0.097 | 0.302 |
| Example 3 | 15.0 | 0.101 | 0.305 |

Table 2 shows the above-described physical property measurement data.

TABLE 2

| | Density (g/cm$^3$) | MI (g/10 min) | MFR | Mn (g/mol) | Mw (g/mol) | PDI (Mw/Mn) | Hardening Stiffness 25° C. | Hardening Stiffness 80° C. | ESCR (hr) |
|---|---|---|---|---|---|---|---|---|---|
| Example 1 | 0.943 | 0.33 | 65.5 | 24,244 | 179,846 | 7.42 | 0.41 | 0.040 | >9,500 |
| Example 2 | 0.942 | 0.21 | 66.2 | 23,330 | 174,559 | 7.48 | 0.44 | 0.045 | >9,500 |
| Example 3 | 0.940 | 0.20 | 44.8 | 42,506 | 206,777 | 4.86 | 0.42 | 0.040 | >9,500 |
| Comparative Example 1 | 0.9426 | 0.69 | 39.0 | 34,246 | 140,305 | 4.10 | 0.35 | 0.032 | >9,500 |
| Comparative Example 2 | 0.9384 | 0.63 | 24.0 | 66,182 | 156,611 | 2.4 | 0.29 | 0.027 | >9,500 |
| Comparative Example 3 | 0.937 | 0.93 | 17.0 | 51,765 | 113,038 | 2.18 | 0.4 | 0.039 | >9,500 |

Table 3 shows stress (dyn/cm$^2$) according to Hencky Strain ($\varepsilon$).

TABLE 3

| | Elongation Strain (dyn/cm$^2$) | | | | | |
|---|---|---|---|---|---|---|
| | Hencky Strain($\varepsilon$) | | | | | |
| | 0.5 | 1.0 | 1.5 | 2.0 | 2.5 | 3.0 |
| Example 1 | 968,937.4 | 1,361,689.5 | 1,823,317.4 | 2,390,179.0 | 3,796,661.8 | 5,252,393.0 |
| Example 2 | 577,585.3 | 821,434.8 | 1,130,646.6 | 1,528,666.3 | 2,544,972.0 | 3,549,639.8 |
| Example 3 | 986,271.2 | 1,354,672.4 | 1,792,096.4 | 2,380,951.0 | 3,724,232.3 | 4,827,452.5 |
| Comparative Example 1 | 491,603.6 | 623,473.1 | 713,920.6 | 768,023.9 | 839,191.3 | 876,831.2 |
| Comparative Example 2 | 474,937.8 | 567,270.6 | 617,187.8 | 643,981.3 | 678,661.9 | 688,241.8 |
| Comparative Example 3 | 560,974.4 | 600,588.7 | 612,353.4 | 612,115.8 | 628,288.9 | 635,266.4 |

Table 3 shows stress measured while increasing Hencky strain, which is the unit of strain. When the strain rate is 1 (1/s) and the Hencky strain is 3, the stress is 5,252,393.0 dyn/cm$^2$ in Example 1, 3,549,639.8 dyn/cm$^2$ in Example 2, and 4,827,452.5 dyn/cm$^2$ in Example 3. High stress is exhibited as compared with Comparative Examples 1 to 3.

In Table 4, strain hardening was expressed by calculating a ratio value based on a result value when Hencky strain ($\varepsilon$) of Table 3 was 3.0.

TABLE 4

| | Elongation Strain (dyn/cm$^2$) Ratio | | | | | |
|---|---|---|---|---|---|---|
| | Hencky Strain($\varepsilon$) Ratio | | | | | |
| | 3.0/0.5 | 3.0/1.0 | 3.0/1.5 | 3.0/2.0 | 3.0/2.5 | 3.0/3.0 |
| Example 1 | 5.42 | 3.86 | 2.88 | 2.20 | 1.38 | 1.00 |
| Example 2 | 6.15 | 4.32 | 3.14 | 2.32 | 1.39 | 1.00 |
| Example 3 | 4.89 | 3.56 | 2.69 | 2.03 | 1.30 | 1.00 |
| Comparative Example 1 | 1.78 | 1.41 | 1.23 | 1.14 | 1.04 | 1.00 |
| Comparative Example 2 | 1.45 | 1.21 | 1.12 | 1.07 | 1.01 | 1.00 |
| Comparative Example 3 | 1.13 | 1.06 | 1.04 | 1.04 | 1.01 | 1.00 |

In Table 4, the ratio of the elongation strain at Hencky strain of 3.0 to the elongation strain at Hencky strain from 0.5 to 3.0 is in the range of 1.0 to 6.15 for Examples 1 to 3. In particular, the ratio of the elongation strain at Hencky strain of 3.0 to the elongation strain at Hencky strain of 0.5 is 5.42 in Example 1, 6.15 in Example 2, and 4.89 in Example 3 (i.e., 4.89 to 6.15). Such ratios in Examples 1 to 3 were much higher as compared to Comparative Examples 1 to 3.

Table 5 shows the value when the complex viscosity graph according to the frequency shown in FIG. 4 was fitted to the Power Law of Equation 2 by using TA Orchestrator, which is the ARES measurement program of TA Instruments.

TABLE 5

|  | $c_1$(Poise) | $c_2$ |
|---|---|---|
| Example 1 | 170,990 | −0.4723 |
| Example 2 | 144,580 | −0.4514 |
| Example 3 | 178,400 | −0.4130 |
| Comparaive Example 1 | 93,961 | −0.3405 |
| Comparative Example 2 | 106,700 | −0.3056 |
| Comparative Example 3 | 75,622 | −0.2267 |

As shown in Table 5, it can be confirmed that the $C_2$ values of Examples 1 to 3 are significantly low as compared with Comparative Examples 1 to 3. Examples 1 to 3 have a $C_1$ value ranging from 140,000 to 180,000 and a $C_2$ value ranging from −0.5 to −0.4. As the $C_2$ value is lower, excellent flowability is exhibited. Therefore, Examples 1 to 3 show excellent flowability as compared with Comparative Examples 1 to 3.

In FIG. 1, Examples 1 to 3 show high hardening stiffness, despite having low MI, as compared with Comparative Examples 1 to 3. The hardening stiffness is derived from the slope of the strain hardening portion of the tensile test and means the magnitude of stress inside the object, which is required for certain strain. This means that as the hardening stiffness is increased, the environmental stress cracking resistance is higher. Therefore, it is possible to provide a pipe having excellent long-term pressure resistance characteristics as compared with a conventional polyethylene resin pipe.

In addition, since Examples 1 to 3 have higher Hencky strain than the conventional polyethylene pipe, it can be seen from FIG. 3 and Table 4 that the strain hardening is excellent, which increases the long-term pressure resistance characteristics of the pipe.

As described above, it can be seen that the high-density ethylene-based polymers of Examples include the long chain branch from the high hardening stiffness of FIG. 1, and it can also be seen that the high-density ethylene-based polymers of Examples include the long chain branch from the inflection point shown in the van Gurp-Palmen graph of FIG. 5. Since the long chain branch is included, it can be seen that the high-density ethylene-based polymers of Examples have excellent processability.

In addition, as shown in FIGS. 4 and 5, although the ethylene-based polymer according to the present invention has a low MI as compared with Comparative Examples 1 to 3, it shows excellent melt flowability due to a high shear thinning phenomenon. Therefore, since the viscosity is lowered during extrusion or injection processing, the extrusion load is lowered, thereby enabling high-speed production.

In producing the hybrid supported metallocene, since the asymmetric structure of the first metallocene of Formula 1 of the present invention does not have the same electron donating phenomenon of giving electrons from the ligand to the central metal, the bond lengths between the central metal and the ligand are different from each other. Therefore, the steric hindrance received when the monomer approaches the catalytic active site is low.

The second metallocene compound represented by Formula 2 has a bridge structure to protect the catalytic active site and facilitate the approach of the comonomer to the catalytic active site. Therefore, the second metallocene compound has excellent comonomer intrusion characteristics. In addition, the catalytic activity site is stabilized as compared with the non-bridge structure in which the ligands are not linked to each other, thereby forming a high molecular weight.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

The invention claimed is:

1. A high-density ethylene-based polymer produced by polymerization of ethylene and at least one α-olefin,
    wherein a density is 0.930 g/cm³ to 0.970 g/cm³,
    an MI is 0.1 g/10 min to 10 g/10 min,
    an elongation strain measured at 150° C., a strain rate of 1 (1/s), and Hencky strain of 3.0 is 3,000,000 dyn/cm² to 10,000,000 dyn/cm², and a ratio of elongation strain at Hencky strain of 3.0 to elongation strain at Hencky strain from 0.5 to 3.0 is 1.0 to 7.0, and
    a relationship between Hencky strain (εH) and sample length (L) according to time (t) is expressed by Equation 1 below:

$$\varepsilon_H(t)=\dot{\varepsilon}t=\ln L(t)/L_0 \qquad \text{[Equation 1]}$$

εH: Hencky strain
$\dot{\varepsilon}$: Hencky strain rate (1/s)
$L_0$: initial sample length
L: current sample length
t: time in seconds.

2. The high-density ethylene-based polymer of claim 1, wherein when a complex viscosity (Poise) graph according to frequency (rad/s) is fitted to power law of Equation 2 below, a $C_2$ value is −0.5 to −0.4:

$$y=c_1 x^{c_2} \qquad \text{[Equation 2]}$$

x: frequency (rad/s)
y: complex viscosity (Poise)
$c_1$: consistency index
$c_2$: CV index (slope of graph).

3. The high-density ethylene-based polymer of claim 1, wherein the high-density ethylene-based polymer comprises a long chain branch (LCB).

4. The high-density ethylene-based polymer of claim 1, wherein the α-olefin is selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

5. The high-density ethylene-based polymer of claim 1, wherein, when the high-density ethylene-based polymer is a copolymer of ethylene and α-olefin monomer, a content of α-olefin is 0.1 wt % to 10 wt %.

6. The high-density ethylene-based polymer of claim 1, wherein the high-density ethylene-based polymer is an injection, compression, or rotational molding material.

7. The high-density ethylene-based polymer of claim 1, wherein the high-density ethylene-based polymer is polymerized in the presence of a hybrid supported metallocene catalyst comprising at least one first metallocene compound represented by Formula 1 below, at least one second metallocene compound represented by Formula 2 below, at least one cocatalyst compound, and a carrier:

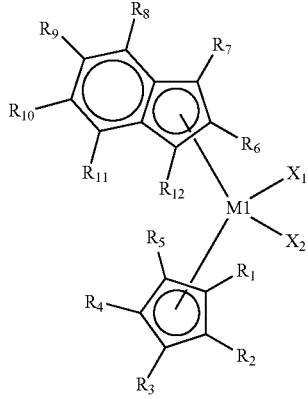

[Formula 1]

wherein, in Formula 1,

M1 is a group 4 transition metal of the periodic table of the elements, $X_1$ and $X_2$ are each independently one of halogen atoms, $R_1$ to $R_{12}$ are each independently a hydrogen atom, a substituted or unsubstituted $C_1$-$C_{10}$ alkyl group, a substituted or unsubstituted $C_6$-$C_{20}$ aryl group, or a substituted or linked unsubstituted $C_7$-$C_{40}$ alkylaryl group, and the two adjacent $R^1$ to $R^{12}$ are optionally linked to each other to form a ring, cyclopentadienyl linked to $R_1$ to $R_5$ and indenyl linked to $R_6$ to $R_{12}$ have an asymmetric structure, and the cyclopentadienyl and the indenyl are not linked to each other to form a non-bridge structure:

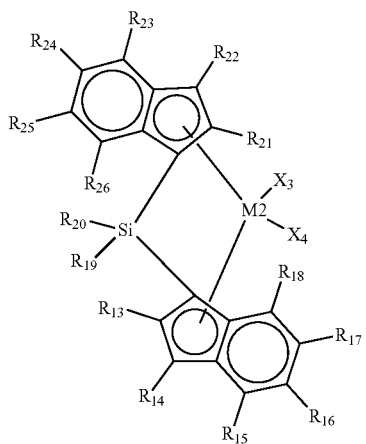

[Formula 2]

wherein, in Formula 2,

M2 is a group 4 transition metal of the periodic table of the elements, $X_3$ and $X_4$ are each independently one of halogen atoms, $R_{13}$ to $R_{18}$ are each independently a hydrogen atom, a substituted or unsubstituted $C_1$-$C_{10}$ alkyl group, a substituted or unsubstituted $C_6$-$C_{20}$ aryl group or a substituted or unsubstituted $C_7$-$C_{40}$ alkylaryl group, and the two adjacent $R^{13}$ to $R^{18}$ are optionally linked to each other to form a ring, $R_{21}$ to $R_{26}$ are each independently a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group, and the two adjacent $R^{21}$ to $R^{26}$ are optionally linked to each other to form a ring, $R_{19}$ and $R_{20}$ are each independently a substituted or unsubstituted $C_1$-$C_{20}$ alkyl group, or optionally linked to each other to form a ring, indenyl linked to $R_{13}$ to $R_{18}$ and indenyl linked to $R_{21}$ to $R_{26}$ have the same structure or different structures, and the indenyl linked to $R_{13}$ to $R_{18}$ and the indenyl linked to $R_{21}$ to $R_{26}$ are linked to Si to form a bridge structure, wherein the substituted $C_1$-$C_{10}$ alkyl group, the substituted $C_6$-$C_{20}$ aryl group, the substituted $C_7$-$C_{40}$ alkylaryl group, the substituted $C_1$-$C_{20}$ alkyl group are a $C_1$-$C_{10}$ alkyl group, a $C_6$-$C_{20}$ aryl group, a $C_7$-$C_{40}$ alkylaryl group, and a $C_1$-$C_{20}$ alkyl group where a hydrogen atom is substituted with a substituent comprising a halogen atom, a C1-C20 hydrocarbon group, a C1-C20 alkoxy group, and a C6-C20 aryloxy group, respectively.

8. The high-density ethylene-based polymer of claim 7, wherein the first metallocene compound is selected from compounds having the following structures:

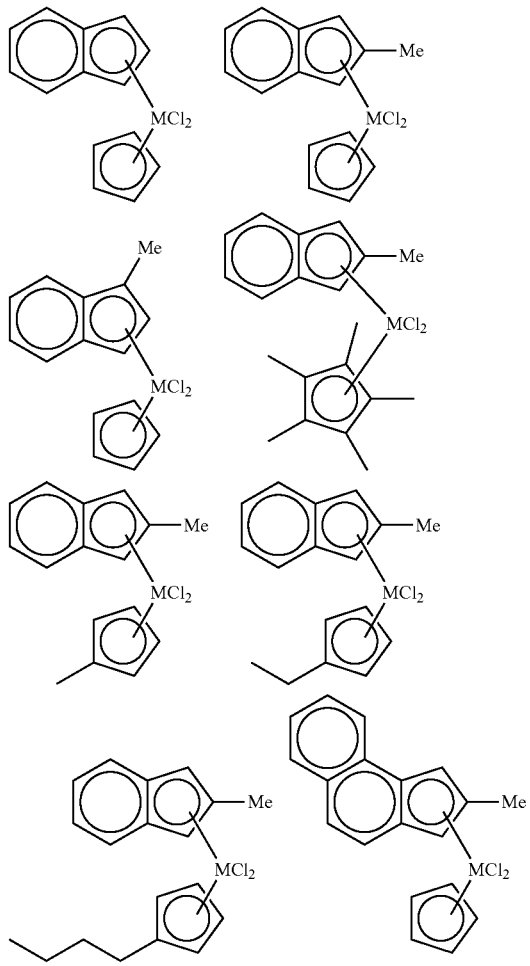

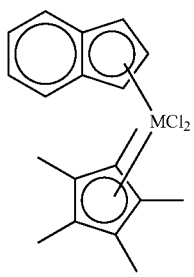
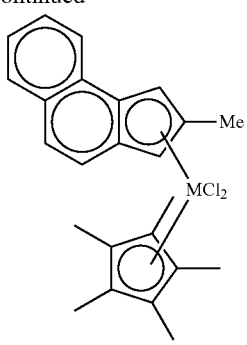
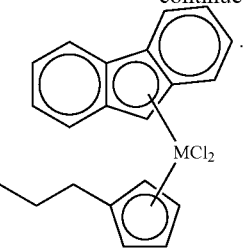
9. The high-density ethylene-based polymer of claim 7, wherein the second metallocene compound is selected from compounds having the following structures:
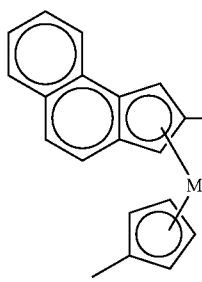
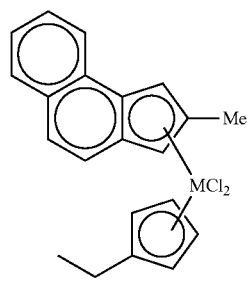
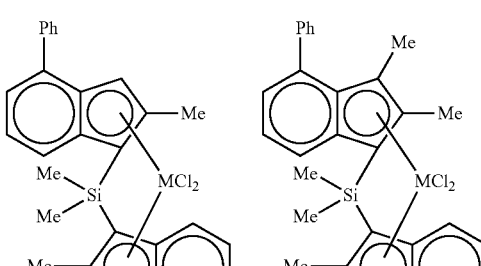
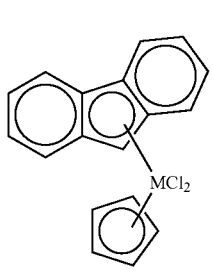
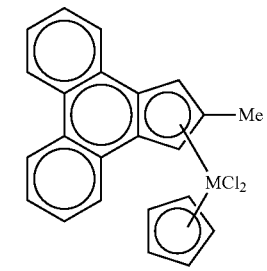
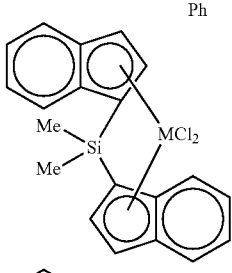
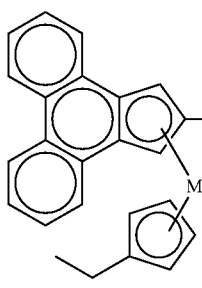
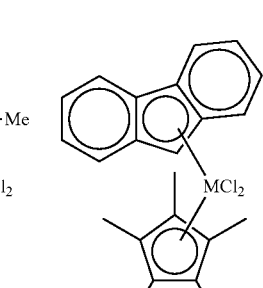
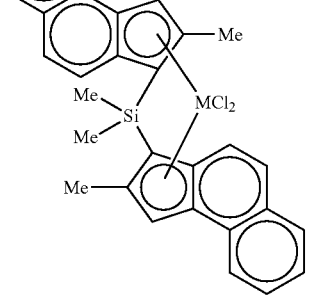
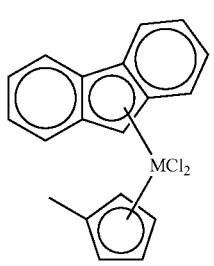
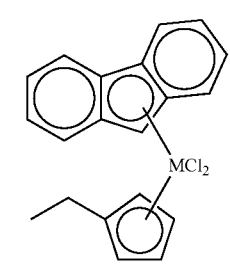
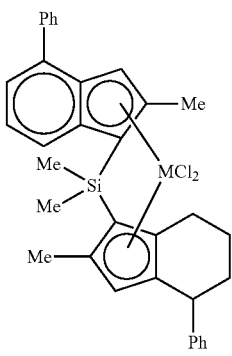

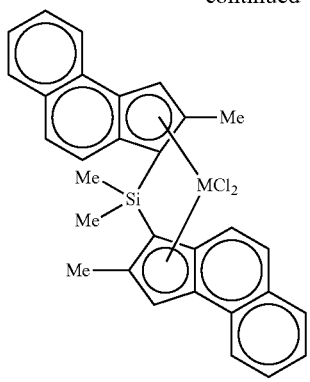
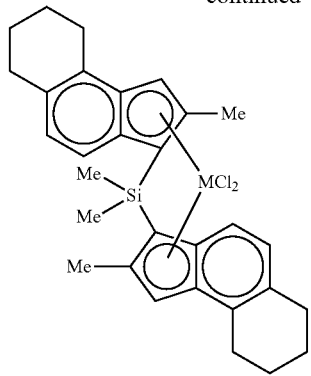
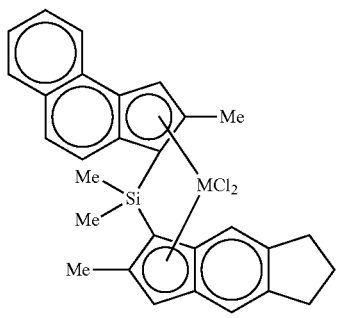
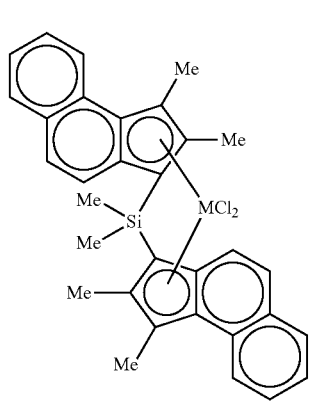
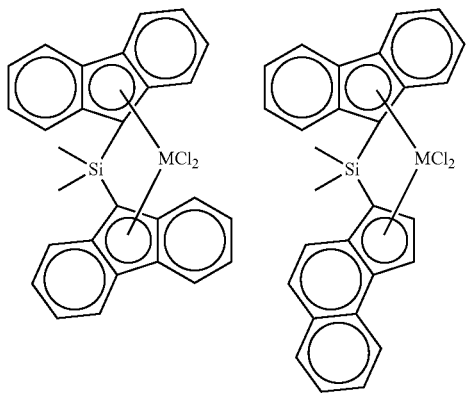
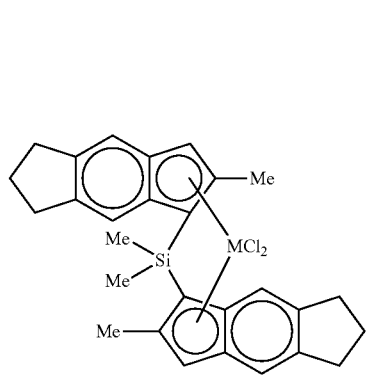
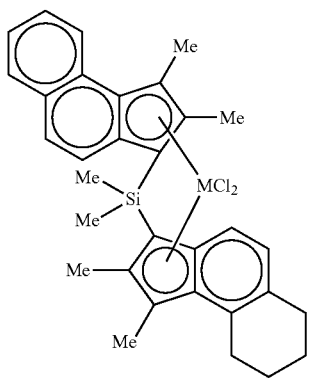
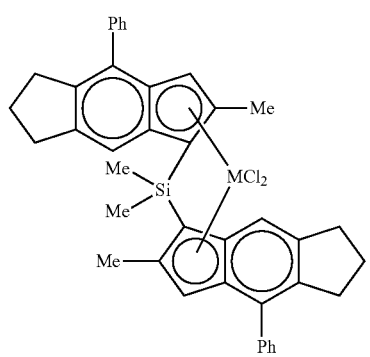

-continued
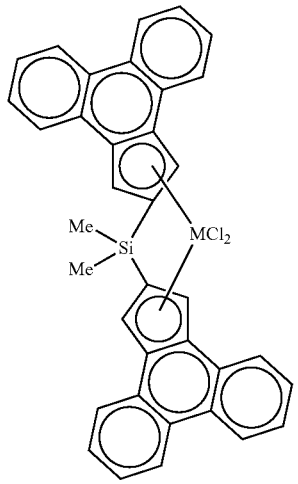
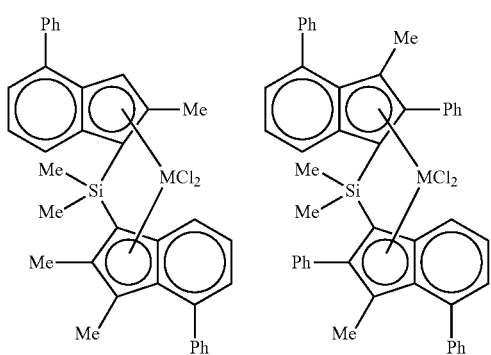
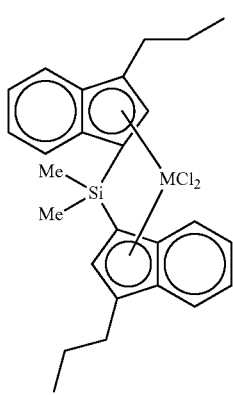
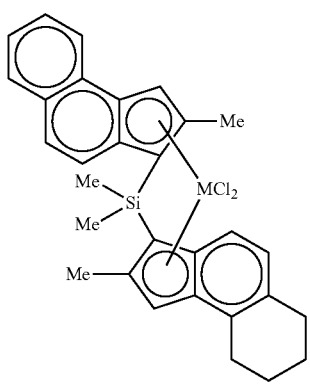
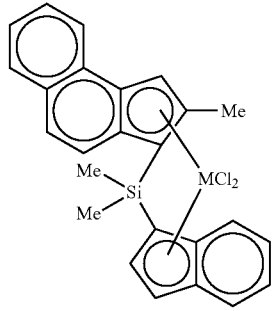
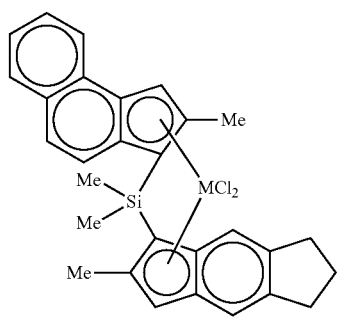
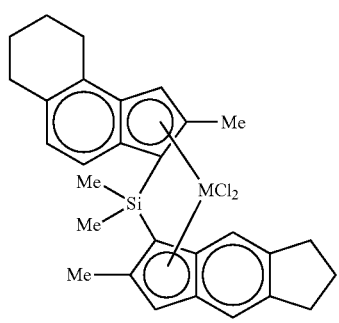
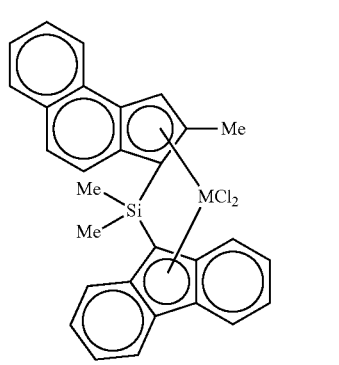
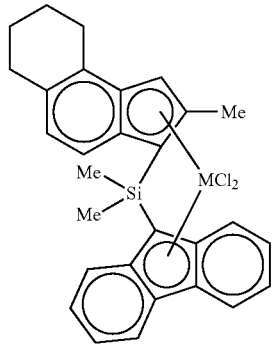

-continued

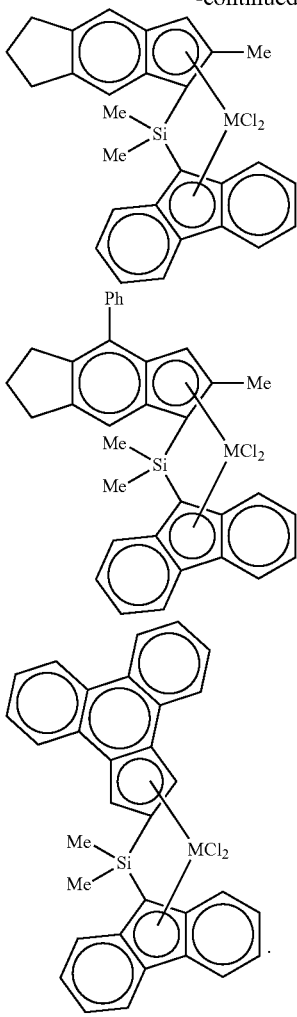

10. The high-density ethylene-based polymer of claim 7, wherein the cocatalyst compound is represented by Formulae 3 to 6 selected from the group consisting of:

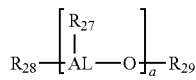   [Formula 3]

wherein, in Formula 3,
AL is aluminum,
$R_{27}$, $R_{28}$, and $R_{29}$ are each independently a halogen atom, a $C_1$-$C_{20}$ hydrocarbon group, or a hydrocarbon atom substituted with a $C_1$-$C_{20}$ halogen, and
a is an integer of 2 or more:

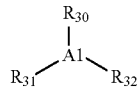   [Formula 4]

wherein, in Formula 4,
A1 is aluminum or boron, and
$R_{30}$, $R_{31}$, and $R_{32}$ are each independently a halogen atom, a $C_1$-$C_{20}$ hydrocarbon group, a hydrocarbon group substituted with a $C_1$-$C_{20}$ halogen, or a $C_1$-$C_{20}$ alkoxy:

$$[L1-H]^+[Z1(A2)_4]^-$$   [Formula 5]

$$[L2]^+[Z2(A3)_4]^-$$   [Formula 6]

wherein, in Formulae 5 and 6,
[L1-H] and [L2] are each independently cationic Lewis acids,
Z1 and Z2 are each independently group 13 elements of the periodic table of the elements, and
A2 and A3 are each independently a substituted or unsubstituted $C_6$-$C_{20}$ aryl group or a substituted or unsubstituted $C_1$-$C_{20}$ alkyl group,
wherein the substituted $C_6$-$C_{20}$ aryl group and the substituted $C_1$-$C_{20}$ alkyl group are a $C_6$-$C_{20}$ aryl group and a $C_1$-$C_{20}$ alkyl group where a hydrogen atom is substituted with a substituent comprising a halogen atom, a C1-C20 hydrocarbon group, a C1-C20 alkoxy group, and a C6-C20 aryloxy group, respectively.

11. The high-density ethylene-based polymer of claim 10, wherein the cocatalyst compound is represented by Formula 3 selected from the group consisting of methylaluminoxane, ethylaluminoxane, isobutylaluminoxane, and butylaluminoxane.

12. The high-density ethylene-based polymer of claim 10, wherein the cocatalyst compound is represented by Formula 4 selected from the group consisting of trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri(p-tolyl)aluminum, dimethylaluminum methoxide, dimethylaluminum ethoxide, trimethylboron, triethylboron, triisobutylboron, tripropylboron, tributylboron, and tripentafluorophenylboron.

13. The high-density ethylene-based polymer of claim 10, wherein the cocatalyst compound is represented by Formula 5 or 6 selected from the group consisting of methyldioctateylammonium tetrakis(pentafluorophenyl)borate, trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl) borate, tripropylammonium tetrakis(p-tolyl)borate, trimethylammonium tetrakis(o,p-dimethylphenyl)borate, triethylammonium tetrakis(o,p-dimethylphenyl)borate, trimethylammonium tetrakis(p-trifluoromethylphenyl)borate, tributylammonium tetrakis(p-trifluoromethylphenyl)borate, tributylammonium tetrakis (pentafluorophenyl)borate, diethylammonium tetrakis (pentafluorophenyl)borate, triphenylphosphonium tetrakis (phenyl)borate, trimethylphosphonium tetrakis(phenyl) borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbonium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl) aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl) aluminate, tributylammonium tetrakis(pentafluorophenyl) aluminate, N,N-diethylanilinium tetrakis(phenyl)aluminate, N,N-diethylanilinium tetrakis(phenyl)aluminate, N,N-diethylanilinium tetrakis(pentafluorophenyl)aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate.

14. The high-density ethylene-based polymer of claim 7, wherein a mass ratio of a total mass of the transition metals of the first metallocene compound and the second metallocene compound to the carrier is 1:1 to 1:1,000, and a mass ratio of the first metallocene compound to the second metallocene compound is 1:100 to 100:1.

15. The high-density ethylene-based polymer of claim 10, wherein a mass ratio of the cocatalyst compounds represented by Formulae 3 and 4 to the carrier is 1:100 to 100:1, and a mass ratio of the cocatalyst compounds represented by Formulae 5 and 6 to the carrier is 1:20 to 20:1.

16. The high-density ethylene-based polymer of claim 7, wherein the carrier comprises at least one selected from the group consisting of silica, alumina, titanium oxide, zeolite, zinc oxide, and starch, the carrier has an average particle size of 10 microns to 250 microns, the carrier has a microporous volume of 0.1 cc/g to 10 cc/g, and the carrier has a specific surface area of 1 $m^2$/g to 1,000 $m^2$/g.

17. A gas transportation pipe comprising the high-density ethylene-based polymer of claim 1.

18. A water transportation pipe comprising the high-density ethylene-based polymer of claim 1.

* * * * *